United States Patent
Li et al.

(10) Patent No.: US 9,949,433 B2
(45) Date of Patent: Apr. 24, 2018

(54) CUTTING LONGITUDINAL SWATHS GRAIN HARVESTING AND BALING COMBINE

(71) Applicant: JIANGSU UNIVERSITY, Jiangsu (CN)

(72) Inventors: Yaoming Li, Jiangsu (CN); Lizhang Xu, Jiangsu (CN); Zhong Tang, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 15/323,395

(22) PCT Filed: Jul. 11, 2014

(86) PCT No.: PCT/CN2014/082082
§ 371 (c)(1),
(2) Date: Dec. 30, 2016

(87) PCT Pub. No.: WO2016/004631
PCT Pub. Date: Jan. 14, 2016

(65) Prior Publication Data
US 2017/0150678 A1    Jun. 1, 2017

(30) Foreign Application Priority Data
Jul. 7, 2014  (CN) .......................... 2014 1 0319090

(51) Int. Cl.
*A01D 41/00* (2006.01)
*A01D 34/04* (2006.01)
(Continued)

(52) U.S. Cl.
CPC ............. *A01D 41/00* (2013.01); *A01D 34/04* (2013.01); *A01D 61/008* (2013.01); *A01F 7/062* (2013.01);
(Continued)

(58) Field of Classification Search
CPC ........ A01D 41/00; A01D 41/12; A01D 34/04; A01D 61/008; A01D 43/006; A01F 7/062;
(Continued)

(56) References Cited

U.S. PATENT DOCUMENTS 4,846,198 A  * 7/1989  Carnewal ............... A01D 41/00
                                                       460/100
5,682,683 A  * 11/1997  Haimer ................ A01D 43/003
                                                       34/210
(Continued)

FOREIGN PATENT DOCUMENTS

| CA | 2593180 | 1/2009 |
| CN | 2922425 | 7/2007 |

(Continued)

OTHER PUBLICATIONS

Case IH Axial-Flow 2366 specification, downloaded from http://www.agrister.com/combines/case-ih-axial-flow-2366, Jan. 20, 2017 (4 pgs).
(Continued)

*Primary Examiner* — Robert E Pezzuto
*Assistant Examiner* — Adam J Behrens
(74) *Attorney, Agent, or Firm* — Hayes Soloway P.C.

(57) ABSTRACT

A cutting longitudinal swaths grain harvesting and baling combine, includes a grain cutting and conveying system, a threshing and separation system, a grain cleaning apparatus, a grain collection and holding system, a straw compression and baling apparatus, a chassis travelling system, and a driving system; when the combine is harvesting grain in fields, the stalks are cut and conveyed to the threshing and separation system by the grain cutting and conveying system; the threshed and separated straw is compressed and baled by the straw compression and baling apparatus; the
(Continued)

threshed and separated grain is cleaned by the grain cleaning apparatus; and the cleaned grain is conveyed by the grain collection and holding system to a grain storage bin. The combine can achieve harvesting of grain such as rice and wheat as well as compression and baling of threshed straw, having advantages of high working efficiency, stable performance, a simple process, and being time and labor saving.

16 Claims, 11 Drawing Sheets

(51) Int. Cl.

| | | |
|---|---|---|
| *A01D 61/00* | (2006.01) | |
| *A01F 7/06* | (2006.01) | |
| *A01F 12/10* | (2006.01) | |
| *A01F 12/18* | (2006.01) | |
| *A01F 12/44* | (2006.01) | |
| *A01F 15/04* | (2006.01) | |
| *A01F 15/08* | (2006.01) | |

(52) U.S. Cl.
CPC ............ *A01F 12/10* (2013.01); *A01F 12/184* (2013.01); *A01F 12/446* (2013.01); *A01F 15/04* (2013.01); *A01F 15/0875* (2013.01)

(58) Field of Classification Search
CPC ...... A01F 12/10; A01F 12/184; A01F 12/446; A01F 15/04; A01F 15/0875
See application file for complete search history.

(56) References Cited

U.S. PATENT DOCUMENTS

| | | | | |
|---|---|---|---|---|
| 6,421,996 | B1* | 7/2002 | Deutsch ............... | A01D 46/084 |
| | | | | 100/88 |
| 7,591,628 | B2* | 9/2009 | Noonan ............... | A01D 87/127 |
| | | | | 100/89 |
| 8,250,843 | B2* | 8/2012 | Campbell ............... | A01D 41/14 |
| | | | | 100/100 |
| 8,313,362 | B2* | 11/2012 | Roberge ............. | A01D 41/1252 |
| | | | | 460/111 |
| 9,107,342 | B2* | 8/2015 | Abbott ................... | A01D 41/06 |
| 9,420,744 | B2* | 8/2016 | Foster .................. | A01D 69/005 |
| 9,756,786 | B2* | 9/2017 | Heitmann ............. | A01D 41/127 |
| 2008/0141639 | A1* | 6/2008 | Shields .................. | A01D 41/00 |
| | | | | 56/14.6 |
| 2010/0330337 | A1* | 12/2010 | Dillon .................... | A01D 41/10 |
| | | | | 428/156 |
| 2012/0096827 | A1* | 4/2012 | Chaney ............... | A01F 15/0833 |
| | | | | 56/341 |
| 2013/0291507 | A1* | 11/2013 | Williams ............... | A01D 46/08 |
| | | | | 56/13.5 |

FOREIGN PATENT DOCUMENTS

| | | | | |
|---|---|---|---|---|
| CN | 101584279 | 11/2009 | | |
| CN | 101984782 | 3/2011 | | |
| CN | 102279099 | 12/2011 | | |
| CN | 202135497 | 2/2012 | | |
| EP | 2241174 | 10/2010 | | |
| JP | 3851159 | 11/2006 | | |
| WO | WO-2007107613 | A1 * | 9/2007 | ............ A01D 37/00 |
| WO | WO-2007148741 | A1 * | 12/2007 | ............ A01D 41/00 |

OTHER PUBLICATIONS

Case IH Axial-Flow 2388 specification, downloaded from http://www.agrister.com/combines/case-ih-axial-flow-2388-02, Jan. 20, 2017 (4 pgs).
International Preliminary Report on Patentability (w/translation) issued in application PCT/CN2014/082082, dated Jan. 10, 2017 (16 pgs).
International Search Report and Written Opinion (w/translation) issued in application No. PCT/CN2014/082082, dated Dec. 31, 2014 (20 pgs).
Jin et al., "Design and Experiment of Non-Landing Bundling Device after Combine Harvester," Nanjing Agricultural Mechanization Research Institute, Ministry of Agriculture, Nanjing, 2011, with machine translation, pp. 147-150 (11 pgs).
New Holland CR960 specification, downloaded from http://www.agrister.com/combines/new-holland-cr960, Jan. 20, 2017 (4 pgs).
New Holland CR980 specification, downloaded from http://www.agrister.com/combines/new-holland-cr980, Jan. 20, 2017 (4 pgs).

* cited by examiner

CUTTING LONGITUDINAL SWATHS GRAIN HARVESTING AND BALING COMBINE

TECHNICAL FIELD

The present invention relates to the field of agricultural machinery manufacturing, which specifically speaking is a cutting longitudinal swaths grain harvesting and baling combine. The combine can be used to the high efficiency harvesting of grain such as rice and wheat as well as compressing and baling of threshed straw.

TECHNOLOGICAL BACKGROUND

Stalks of rice and wheat are often smashed into field after harvested by the existing grain combine for rice and wheat, scattering on the ground. Farmers often burn the straw in the field for the harvested straw in the field can affect the next crops and it is not easy to become putrid. Burning straw affects air quality seriously and the government's instructions are difficult to solve the problem of burning straw effectively. For this reason, rice and wheat picking and baling machine begins to appear in many countries, which can compress and bale the threshed stalks and put them in the field in orderly rows. Then farmers sell the straw bale to power plant, which not only can decrease the effect of straw in the field on the next crops, but also can provide fuel for the power plant and alleviate the issue of energy crisis in our country.

The cutting swath and single (double) longitudinal axial flow combined type full feeding harvester combine developed by international large harvester combine manufacturing enterprise John Deer, Case and New Holland, such as series of Case 2388 and 2366 single longitudinal axial flow, New Holland CR 980 and CR 960 double longitudinal axial flow combine is a kind of large dry land operation harvester combine. This kind of combine can harvest the grain firstly, then smash the stalks and return them to the field. A kind of rice and wheat harvesting and baling machine made known to the public by Chinese patent 201010513972.2, devised a machine that can compress and bale the chaff severed from the sorting screen with the stalks. In the document the design and trial of combine with not falling to the ground baling apparatus (Research on Agricultural Mechanization, 2011 (7), 147~150), researchers developed a combine with not falling to the ground baling apparatus on the basis of the existing round bale machine, and optimized the power selection, the design of drive system, the combined harvesting device and the linkage, and the feeding and rope winding mechanism. The forgoing has made some improvement and research aiming at the problems of compressing and baling of threshed straw; the picking and baling technology of rice and wheat picking and baling machine has been mature on the whole. But all the forgoing baling mechanisms work independently, picking and baling the straw in the field independently, which have low efficiency, high cost and complicated procedure. A kind of harvesting and baling combine made known to the public by Chinese patent ZL00620074426.2, put a baling apparatus on the bottom of the grass mouth of a combine harvester; the straw can be exhausted to the grass mouth of the baling apparatus after threshed in the shelled cylinder, which realized the integration of harvesting and straw baling of rice and wheat. But this kind of machine hangs a baling machine on the combine as a backpack, which is a superimposed combination of combine and baling machine. There are some problems of this kind of machine, such as insufficient strength of transmission, irrational power distribution, which decreased the security of the combine to a great extent. The integration of combine and baling machine may cause irrational centre of gravity of the combine, which is easy happen to turn on its side and cause serious casualties.

CONTENTS OF THE INVENTION

The technical problems of the present invention to be solved are as follows. Provide a combine machine that can realize the integration of harvesting and baling for rice and wheat, to overcome the difficulties of the integration of stem cutting, delivery, threshing, refining, and compressing stalks during the grain combine working in a small damp field, to solve problems such as its insufficient strength of transmission, high fault rate of the machine, irrational power distribution and low security caused by hanging a baling machine on the combine, and easy turning to its side and causing serious casualties for irrational centre of gravity of the combine. Through the rational arrangement of grain cutting and conveying system, grain threshing and separation system, grain cleaning apparatus, grain collection and holding system, a straw compressing and baling apparatus, a chassis travelling system and a driving system of a kind of cutting longitudinal swaths grain harvesting and baling combine, it can realize the requirement of harvesting and straw compressing for rice and wheat, which has advantages of high efficiency, simple process, saving time and labor, low fault rate and security.

The technical solution of the present invention is a kind of cutting longitudinal swaths grain harvesting and baling combine, consisting of the grain cutting and conveying system, grain threshing and separation system, grain cleaning apparatus, grain collection and holding system, a straw compressing and baling apparatus, a chassis travelling system and a driving system. The grain cleaning apparatus is located over The chassis travelling system, the grain threshing and separation system is located over the grain cleaning apparatus, The straw compressing and baling apparatus is located under the grain threshing and separation system and in the rear of the grain cleaning apparatus, the grain cutting and conveying system is located in front of the grain threshing and separation system, The driving system is located above the grain cutting and conveying system, and the grain collection and holding system is located above The chassis travelling system and beside the grain threshing and separation system.

The grain cutting and conveying system consists of material cutting device and material delivery device. The material cutting device is connected with the material delivery device, and the former is located in front of the latter. The material cutting device consists of spokes, teeth, reciprocating cutter, feed auger, spoke plate of the reel, the reel drive pulley, the cutting platform drive pulley, the feed auger drive pulley and cutter wobblers. The teeth are connected with the spokes, and the spokes are connected with the spoke plate of the reel. The spoke plate of the reel is located above the feed auger, the reciprocating cutter is located under the spoke plate of the reel and in front of the feed auger, the reel drive pulley is connected with the spoke plate of the reel, and the feed auger drive pulley is connected with the feed auger. The cutter wobblers are connected with the reciprocating cutter, and the cutting platform drive pulley is connected with the feed auger drive pulley. The material delivery device consists of driving wheel of conveying channel a, conveying chain a, conveying chain b, material batten and driving wheel of conveying channel b. The conveying chain and the conveying chain b are located outside the conveying channel drive pulley and the conveying channel drive pulley b. The material batten is located outside the conveying chain and the conveying chain b.

The grain threshing and separation system consists of cutting swath threshing and separating device and longitudinal swath threshing and separating device. The cutting swath threshing and separating device consists of cutting swath roller cover plate, cutting swath spike teeth threshing unit, cutting swath grid concave sieve, cutting swath spokes, cutting swath roller drive belt pulley, cutting swath drive sprocket, cutting swath roller spoke plate, cutting swath roller bearing and cutting swath roller axle. The cutting swath spike teeth threshing unit is connected with the cutting swath spokes, the cutting swath spokes are connected with the cutting swath roller spoke plate, the cutting swath roller spoke plate is connected with the cutting swath roller bearing, and the cutting swath roller bearing is connected with the cutting swath roller axle. The cutting swath roller drive belt pulley and the cutting swath drive sprocket are connected with the cutting swath roller axle. The cutting swath roller cover plate is located above the cutting swath roller spoke plate, and the cutting swath grid concave sieve is located under the cutting swath roller spoke plate. The longitudinal swath threshing and separating device consists of spiral feeding head, longitudinal swath roller grid concave sieve, longitudinal swath spoke plate, longitudinal swath drive pulley, longitudinal swath spokes, longitudinal swath spike teeth threshing unit, top cap deflector, longitudinal swath roller top cap, feeding spiral blade, rethreshing auger, longitudinal swath roller axel and longitudinal swath roller bearing. The feeding spiral blade is located outside the spiral feeding head. The spiral feeding head is connected with the longitudinal swath spokes. The longitudinal swath spokes are connected with the longitudinal swath spoke plate. The longitudinal swath spoke plate is connected with the longitudinal swath roller axel. The longitudinal swath drive pulley is connected with the longitudinal swath roller axel, the longitudinal swath roller bearing is connected with longitudinal swath roller axel. The top cap deflector is corrected with the longitudinal swath roller top cap and located inside it. The longitudinal swath roller top cap is located above the longitudinal swath spoke plate, the longitudinal swath roller grid concave sieve is located under the longitudinal swath spoke plate, and the rethreshing auger is connected with the longitudinal swath roller grid concave sieve.

The grain cleaning apparatus consists of shuttle board, the upper vibrating screen, the under vibrating screen, cleaning varia auger and cleaning centrifugal fan. The shuttle board is located above the upper vibrating screen, and the upper vibrating screen is located above the under vibrating screen. The cleaning centrifugal fan is located under the upper vibrating screen, and also is located above and in front of the under vibrating screen. The cleaning varia auger is located above the shuttle board. The upper vibrating screen consists of scalping board, sieve plate and sawtooth vibrating tail screen. The scalping board is located above the sieve plate, and the sieve plate is located in front of the sawtooth vibrating tail screen. The under vibrating screen consists of woven screen and vibrating screen flywheel. The cleaning centrifugal fan consists of under draught distributing board and top draught distributing board. The crank of the shuttle board is connected with the shuttle board, and the vibrating screen flywheel is connected with the crank of the shuttle board. The grain collection and holding system consists of grain storage box, grain collecting auger and varia collecting auger. The grain collecting auger is connected with the grain storage box. The varia collecting auger is connected with the longitudinal swath threshing and separating device.

The straw compressing and baling apparatus consists of straw feeding mechanism, power input mechanism, baling drive tensioning wheel, drive pulley, pre press mechanism drive pulley, connecting rod feeding mechanism, grass feeding mechanism drive pulley, weed discharging pulley, straw knotting drive pulley, crank pre pressing mechanism and square bale discharging mechanism. The straw feeding mechanism is connected with the square bale discharging mechanism. The crank pre pressing mechanism is connected with the straw feeding mechanism. The connecting rod feeding mechanism is connected with the square bale discharging mechanism. The pre press mechanism drive pulley is connected with the crank pre pressing mechanism. The grass feeding mechanism drive pulley is connected with the square bale discharging mechanism. The straw knotting drive pulley is connected with the square bale discharging mechanism. The power input mechanism, the baling drive tensioning wheel, the drive pulley, the pre press mechanism drive pulley, the grass feeding mechanism drive pulley, the weed discharging pulley and the straw knotting drive pulley are connected with each other.

The chassis travelling system consists of caterpillar band walking system, chassis frame member, engine and speed variator. The caterpillar band walking system is connected with the bottom of the chassis frame member. The engine is connected with the caterpillar band walking system through the speed variator. The caterpillar band walking system consists of caterpillar band a, caterpillar band b, drive pulley, guide pulley, thrust wheel and riding wheel. The drive pulley, the guide pulley, the thrust wheel and the riding wheel are located inside the caterpillar band and the caterpillar band b. The chassis frame member consists of chassis supporting frame and chassis platform frame. The chassis supporting frame is connected with the top of the chassis platform frame. The driving system consists of dricab and operating arm.

The motive power of the engine is controlled by the operating arm of the driving system. The engine transmits power to the speed variator by axle, and then the speed variator transmits the power to the drive pulley of the caterpillar band walking system. The engine transmits power to the cutting swath threshing and separating device by belt, and then the cutting swath drive sprocket of the cutting swath threshing and separating device transmits the power to the longitudinal swath threshing and separating device. Then the longitudinal swath drive pulley of the longitudinal swath threshing and separating device transmits the power to the cleaning varia auger and the rethreshing auger. The longitudinal swath drive pulley transmits power to the power input mechanism of The straw compressing and baling apparatus by chain, and the power input mechanism is connected with the baling drive tensioning wheel, the drive pulley, the pre press mechanism drive pulley, the grass feeding mechanism drive pulley and the straw knotting drive pulley by the same chain. The straw knotting drive pulley transmits the power to the weed discharging pulley and the connecting rod feeding mechanism. The cutting swath roller drive belt pulley of the cutting swath threshing and separating device transmits power to the material delivery device. The conveying channel drive pulley a of the material delivery device is connected with the conveying channel drive pulley b by chain. The conveying channel drive pulley b transmits power to the cutting platform drive pulley of the material cutting device by chain, and then the cutting platform drive pulley transmits the power to the feed auger drive pulley and cutter wobblers. The feed auger drive pulley transmits the power to the reel drive pulley. The cutting swath drive sprocket transmits the power to the shuttle board and the upper vibrating screen, and then the upper vibrating screen transmits the power to the under vibrating screen and the crank of the shuttle board. The under vibrating screen transmits the power to the grain collecting auger and the varia collecting auger.

In the forgoing scheme, the cutting swath threshing and separating device is disposed transversally on the chassis frame, and the longitudinal swath threshing and separating device is longitudinally disposed on the chassis frame. The exit of the cutting swath threshing and separating device is connected with the entrance of the longitudinal swath threshing and separating device. The transverse center line of the cutting swath threshing and separating device coincides with the longitudinal center line of the longitudinal swath threshing and separating device. The rear-end of the material delivery device is connected with the fore-end of the cutting swath threshing and separating device. The longitudinal center line of the material delivery device coincides with the transverse center line of the cutting swath threshing and separating device. The straw compressing and baling apparatus is located just below the rear-end of the longitudinal swath threshing and separating device. The straw feeding mechanism of the straw compressing and baling apparatus is connected with the straw outlet of the longitudinal swath threshing and separating device. The grain cleaning apparatus is located just below the cutting swath threshing and separating device and the longitudinal swath threshing and separating device. The longitudinal center line of the grain cleaning apparatus parallels to the longitudinal center line of the longitudinal swath threshing and separating device. The fore-end of the grain cleaning apparatus is flush with the fore-end of the cutting swath threshing and separating device.

In the forgoing scheme, the spoke plate of the reel is located above the reciprocating cutter. The feed auger drive pulley is located behind the reciprocating cutter. The spoke plate of the reel constitutes a triangle with the reciprocating cutter and the section midpoint of the feed auger drive pulley. The circumference of the spoke plate of the reel is uniformly connected with five spokes. Two spoke plates of the reel are located at both ends of the spokes symmetrically. The teeth are distributed uniformly in the spokes and the teeth top is downward. The angle between the longitudinal center line of the material delivery device and the horizontal is 25°~45°. The fore-end of the material delivery device is connected with the material cutting device, and the rear-end of the material delivery device is connected with the cutting swath threshing and separating device. The conveying chain and the conveying chain b are closed type, sheathing on the shaft ends of the conveying channel drive pulley and the conveying channel drive pulley b. The material battens are linked uniformly on the conveying channel drive pulley and the conveying channel drive pulley b.

Furthermore, the feed auger drive pulley is located in the back of the reciprocating cutter 0.8 m~1.2 m, and the feed auger drive pulley is located above the reciprocating cutter 0.2 m~0.3 m. The spoke plates of the reel are located in front of the reciprocating cutter 0.6 m~1.2 m. The spoke plate of the reel is pentagon, and its external diameter is 1.5 m~2.0 m, and its spoke length is 3 m~4 m and the tooth length is 0.015 m~0.02 m. The circumference of the conveying chain and the conveying chain b is 3.5 m~4.5 m. The center distance between the conveying channel drive pulley and the conveying channel drive pulley b is 1.6 m~2.0 m. The distribution distance of the material battens on the conveying channel drive pulley and the conveying channel drive pulley b is 0.02 m~0.035 m.

In the forgoing scheme, the fore-end of the cutting swath threshing and separating device is connected with the rear-end of the material delivery device. The rear-end of the cutting swath threshing and separating device is connected with the fore-end of the longitudinal swath threshing and separating device. There is the cutting swath roller cover plate above the cutting swath threshing and separating device and the cutting swath grid concave sieve under it. The cutting swath roller cover plate and the cutting swath grid concave sieve constitute the threshing and separating cavity of the cutting swath threshing and separating device together. The cutting swath spokes and the cutting swath spike teeth threshing unit are located inside the threshing and separating cavity. The cutting swath roller bearings are installed on the cutting swath roller spoke plate at both ends of the cutting swath roller axle. One cutting swath roller bearing installs cutting swath roller drive belt pulley and cutting swath drive sprocket, and the cutting swath drive sprocket is in the middle of the cutting swath roller drive belt pulley. Three cutting swath roller spoke plates are installed on the cutting swath roller axle uniformly, and six cutting swath spokes are installed on the circumference of the three cutting swath roller spoke plates uniformly. The cutting swath spike teeth threshing units are installed on the cutting swath spokes uniformly.

Furthermore, the length of the cutting swath roller axle is 1.2 m~1.5 m, and the external diameter of the cutting swath roller spoke plate is 0.4 m~0.6 m, and the height of the cutting swath spike teeth threshing unit is 0.055 m~0.075 m. The distribution distance of the cutting swath spike teeth threshing unit installed on the cutting swath spokes is 0.08 m~0.12 m.

In the forgoing scheme, the fore-end of the longitudinal swath threshing and separating device is connected with the cutting swath threshing and separating device. The rear-end of the longitudinal swath threshing and separating device is connected with The straw compressing and baling apparatus. The angle between the longitudinal axis of the longitudinal swath threshing and separating device and the horizontal is 3°~5°. The longitudinal swath roller axel installs longitudinal swath drive pulley. Two longitudinal swath roller bearings are installed on the both ends of the longitudinal swath roller axel. The top cap deflector is above the longitudinal swath threshing and separating device, and the longitudinal swath roller grid concave sieve is beside the longitudinal swath threshing and separating device. The top cap deflector and the longitudinal swath roller grid concave sieve constitute the threshing and separating cavity of the longitudinal swath threshing and separating device. The spiral feeding head is located in front of the threshing and separating cavity. The longitudinal swath spoke plate is located behind the threshing and separating cavity. Four longitudinal swath spoke plates are installed on the longitudinal swath roller axel uniformly. And six longitudinal swath spokes are installed on the circumference of the four longitudinal swath spoke plates. The longitudinal swath spike teeth threshing units are installed on the longitudinal swath spokes uniformly, and they are located inside the threshing and separating cavity of the longitudinal swath threshing and separating device. The spiral feeding head is installed on the longitudinal swath spoke plate of the longitudinal swath roller axel. The spiral feeding head installs four pieces of feeding spiral blades.

Furthermore, the length of the longitudinal swath roller axel is 2.5 m~3.5 m, and the external diameter of the longitudinal swath spoke plate is 0.4 m~0.6 m. The distribution distance of the longitudinal swath spike teeth threshing unit installed on the longitudinal swath spokes is 0.12 m~0.15 m. The spiral feeding head is frustum cone-like, and its maximal external diameter is 0.4 m~0.6 m, and its minimal external diameter is 0.2 m~0.4 m. The height of the spiral feeding head is 0.035 m~0.045 m. The outboard height of the feeding spiral blade is flush with the outboard height of the longitudinal swath spike teeth threshing unit.

In the forgoing scheme, the grain cleaning apparatus is located just below the cutting swath threshing and separating device and the longitudinal swath threshing and separating device. The upper vibrating screen is located above the under vibrating screen. The shuttle board is located in front of the upper vibrating screen. The sawtooth vibrating tail screen is located at the rear-end of the upper vibrating screen. The sieve plate is located in front of the upper vibrating screen. The upside of the sieve plate installs 3~5 pieces of scalping boards. The cleaning centrifugal fan is located just below the shuttle board. The front of the cleaning centrifugal fan is flush with the front of the shuttle board. The rear of the cleaning centrifugal fan is flush with the front of the upper vibrating screen. The under vibrating screen is located on the centre line of the cleaning centrifugal fan. There are under draught distributing board and top draught distributing board at their outlet of the cleaning centrifugal fan. The extension line of the top draught distributing board passes through the center of the upper vibrating screen. The extension line of the under draught distributing board intersects with the rear of the under vibrating screen. The grain collecting auger is installed at the downside ¼ position of the under vibrating screen. The varia collecting auger is installed at the rear downside of the under vibrating screen. The grain collecting auger is flush with the bottom of the cleaning centrifugal fan. The varia collecting auger is connected with the cleaning varia auger and the rethreshing auger. The rear end of the rethreshing auger is located above the shuttle board and connected with the longitudinal swath threshing and separating device. The under vibrating screen uses a structure of woven screen.

Furthermore, the length of the grain cleaning apparatus is 2.0 m~2.5 m, width is 1.2 m~1.5 m, height is 0.6 m~0.8 m. The distance between the shuttle board and the upper vibrating screen is 0.05 m~0.10 m. The rear end of the shuttle board overlaps 0.5 m~0.8 m with the upper vibrating screen. The upper vibrating screen is located 0.10 m~0.15 m above the under vibrating screen. The external width of the upper vibrating screen and the under vibrating screen is 1.2 m~1.5 m.

In the forgoing scheme, the straw compressing and baling apparatus is connected with longitudinal swath threshing and separating device, installed on the chassis platform frame. The power input mechanism transmits power to the grass feeding mechanism drive pulley, the straw knotting drive pulley and the pre press mechanism drive pulley by the same chain. The drive pulley and the baling drive tensioning wheel are installed between the power input mechanism and the pre press mechanism drive pulley. The grass feeding mechanism drive pulley is installed at the middle of the straw feeding mechanism. The straw feeding mechanism transmits straw by using chain harrow. The pre press mechanism drive pulley transmits power to the crank pre pressing mechanism, and the crank pre pressing mechanism compresses the straw. The straw knotting drive pulley is installed at the rear of the straw feeding mechanism, and the straw knotting drive pulley bales and knots the compressed square straw block. The weed discharging pulley is installed at the top of the square bale discharging mechanism. Then the connecting rod feeding mechanism cuts off the compressed knotted square straw bale and extracts it out of the square bale discharging mechanism.

Furthermore, the total length of The straw compressing and baling apparatus is 2.0 m~2.5 m, and width is 0.5 m~0.7 m, and height is 0.8 m~1.2 m. The angle between the straw feeding mechanism and the main body of The straw compressing and baling apparatus is 20°~30°, and The angle between the main body of The straw compressing and baling apparatus and the horizontal is 10°~15°.

In the forgoing scheme, the engine is located at the chassis frame member. The chassis platform frame is connected with the chassis supporting frame. And the chassis supporting frame is connected with the caterpillar band walking system. There are caterpillar band and caterpillar band b installed at the two sides of the chassis supporting frame. There are supporting rollers installed at the top of the caterpillar band and the caterpillar band b, drive pulleys at the front, guide pulleys at the rear, and six thrust wheels at the middle. The speed variator is connected with the engine and the drive pulley.

Furthermore, the width of the chassis frame member is 2.0 m~2.5 m, and length is 2.5 m~3.5 m, and height is 0.5 m~0.6 m. The height of the caterpillar band and caterpillar band b is 0.4 m~0.6 m, and length is 2.0 m~2.5 m, and width is 0.4 m~0.5 m.

In the forgoing scheme, the distance between the top of the dricab and the upside of the chassis frame member is 2.0 m~2.5 m. The longitudinal length of the dricab along the chassis frame member is 1.5 m~2.0 m, and the transverse width is 2.0 m~2.5 m.

Compared with the existing technology, beneficial effects of the present invention are as follows:

1. By using the newly designed cutting longitudinal swaths grain threshing and separation system, it can achieve the threshing and separating function for rice and wheat of high water ratio, and its work efficiency is higher 40%~60% than other grain threshing and separation systems under the same configuration parameters. The cutting longitudinal swaths grain threshing and separation system is compact, which can be installed at medium and small sized combine harvesters, having advantages such as simple structure, high threshing and separating efficiency and low grain loss rate.

2. By using the newly designed grain cleaning apparatus, the cleaning centrifugal fan divides their outlet current into a few beams of currents with pieces of draught distributing board, making their current distribution on the sieve more reasonable. By using the newly designed shuttle board, upper vibrating screen and under vibrating screen, its structure can match with the cutting longitudinal swaths grain threshing and separation system dexterously, and can overcome the difficulty of conventional air-screen cleaning devices failing to solve the problems of high loss rate and low cleanliness.

3. By using the newly designed a chassis travelling system and caterpillar band walking system, the drive pulley, guide pulley, thrust wheel and riding wheel match with the caterpillar band of the caterpillar band walking system, which can walk on wet land freely and have advantage of strong flexibility in small plots of wet and soft. The maximum forward speed of the caterpillar band walking system can match with the work efficiency of the grain cutting and conveying system, the grain threshing and separation system and the grain cleaning apparatus.

4. The present invention achieves the integrated compound operation of rice and wheat harvesting and baling, which can reduce working procedure, decrease the cost of gathering stalks, and reduce the input of manpower and energy consumption. It can provide straw burning raw material for new energy enterprise and food raw material for livestock breeding industry by compressing and baling stalks. It is propitious to build a conservation-minded society, decreases environmental pollution, and reduces working hours, which is extremely favorable to grab farming season without affecting the subsequent agricultural production. Farmers compress, bale and sell stalks by using the machine in time, which can increase income and grab farming season, improving production efficiency and economic benefits.

In the picture, 1. material cutting device, 101. spokes, 102. teeth, 103. reciprocating cutter, 104. feed auger, 105. spoke plate of the reel, 106. reel drive pulley, 107. cutting platform drive pulley, 108. feed auger drive pulley, 109. cutter wobblers, 2. material delivery device, 201. conveying channel drive pulley a, 202. conveying chain a, 203. conveying chain b, 204. material batten, 205. Conveying channel drive pulley b, 3. a driving system, 301. dricab, 302. operating arm, 4. caterpillar band walking system, 401. caterpillar band a, 402. caterpillar band b, 403. drive pulley, 404. guide pulley, 405. thrust wheel, 406. riding wheel, 5. cutting swath threshing and separating device, 501. cutting swath roller cover plate, 502. cutting swath spike teeth threshing unit, 503. cutting swath grid concave sieve, 504. cutting swath spokes, 505. cutting swath roller drive belt pulley, 506. cutting swath drive sprocket, 507. cutting swath roller spoke plate, 508. cutting swath roller bearing, 509. cutting swath roller axle, 6. longitudinal swath threshing and separating device, 601. spiral feeding head, 602. longitudinal swath roller grid concave sieve, 603. longitudinal swath spoke plate, 604. longitudinal swath drive pulley, 605. longitudinal swath spokes, 606. longitudinal swath spike teeth threshing unit, 607. top cap deflector, 608. longitudinal swath roller top cap, 609. feeding spiral blade, 6010. cleaning varia auger, 6011. rethreshing auger, 6012. longitudinal swath roller axel, 6013. longitudinal swath roller bearing, 7. a straw compressing and baling apparatus, 701. straw feeding mechanism, 702. power input mechanism, 703. baling drive tensioning wheel, 704. drive pulley, 705. pre press mechanism drive pulley, 706. connecting rod feeding mechanism, 707. grass feeding mechanism drive pulley, 708. weed discharging pulley, 709. straw knotting drive pulley, 7010. crank pre pressing mechanism, 7011. square bale discharging mechanism, 8. grain cleaning apparatus, 801. shuttle board, 802. sieve plate, 803. the upper vibrating screen, 804. sawtooth vibrating tail screen, 805. cleaning centrifugal fan, 806. under draught distributing board, 807. top draught distributing board, 808. grain collecting auger, 809. the under vibrating screen, 8010. varia collecting auger, 8011. vibrating screen flywheel, 8012. crank of the shuttle board, 8013. woven screen of the under vibrating screen, 8014. scalping board, 9. chassis frame member, 901. chassis supporting frame, 902. chassis platform frame, 10. Engine, 11. speed variator, 12. grain storage box.

SPECIFIC EMBODIMENT

Then next, make a further detailed explanation for the specific embodiment of the present invention with the figures.

It is the further explanation to the concrete implement process of a dual longitudinal-axial-flow roller pressure shunt device of the specific model of the invention combining with the figures.

Figure 1:
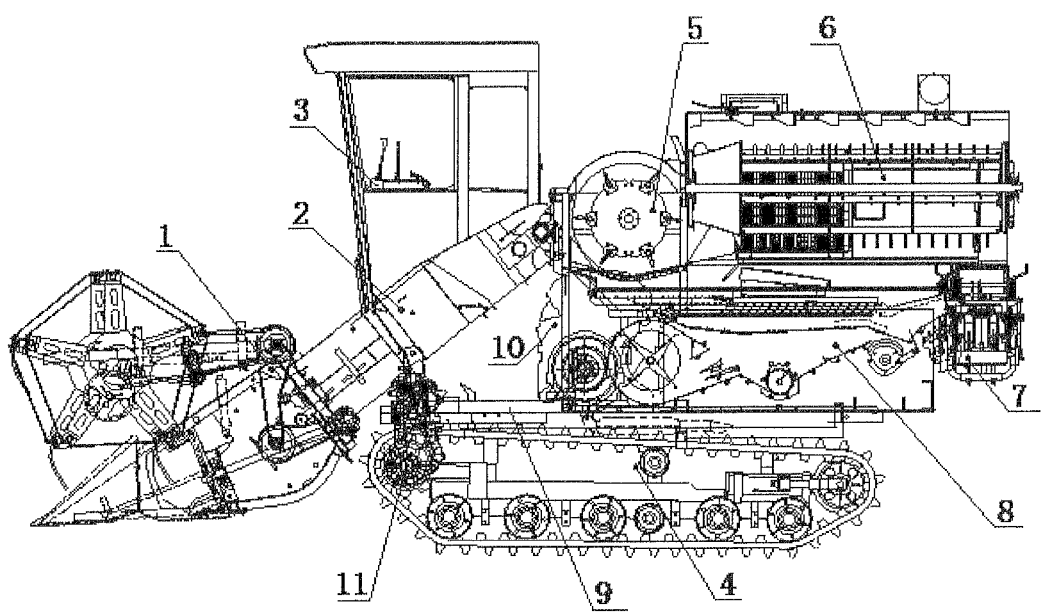
FIG. 1 is the front view of the cutting longitudinal swaths grain harvesting and baling combine.
Figure 2:
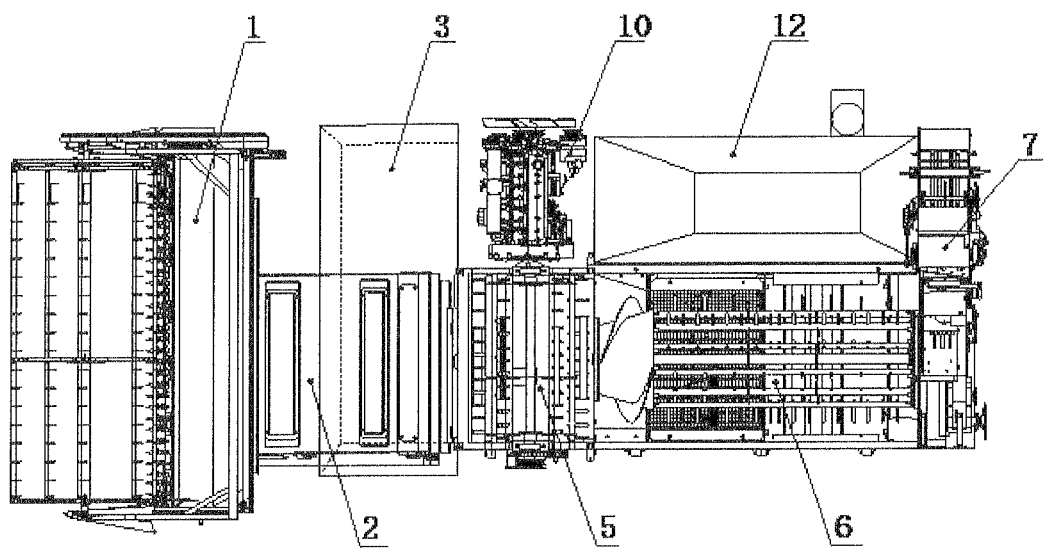
FIG. 2 is the vertical view of the cutting longitudinal swaths grain harvesting and baling combine.

As shown in the FIG. 1 and FIG. 2, a cutting longitudinal swaths grain harvesting and baling combine, which is characterized in that it consists of grain cutting and conveying system, grain threshing and separation system, grain cleaning apparatus, grain collection and holding system, a straw compressing and baling apparatus, a chassis travelling system and a driving system. The grain cleaning apparatus is located over the chassis travelling system. The grain threshing and separation system is located over the grain cleaning apparatus. The straw compressing and baling apparatus is located under the grain threshing and separation system and at the rear-end of the grain cleaning apparatus. The grain cutting and conveying system is located at the fore-end of the grain threshing and separation system. The driving system is located above the grain cutting and conveying system. The grain collection and holding system is located above the chassis travelling system and beside the grain threshing and separation system. The power of the engine 10 is controlled by the operating arm 302 of the driving system 3. The engine 10 delivers power to the speed variator 11 by axle, and the speed variator 11 delivers the power to the drive pulley 403 of the caterpillar band walking system 4. The engine 10 delivers power to the cutting swath threshing and separating device 5 by chain, and the cutting swath drive sprocket 506 of the cutting swath threshing and separating device 5 delivers the power to the longitudinal swath threshing and separating device 6, and then the longitudinal swath drive pulley 604 of the longitudinal swath threshing and separating device 6 delivers the power to the cleaning varia auger 6010 and the rethreshing auger 6011. The longitudinal swath drive pulley 604 delivers the power to the power input mechanism 702 of the straw compressing and baling apparatus by chain. The power input mechanism 702 is connected with the baling drive tensioning wheel 703, the drive pulley 704, the pre press mechanism drive pulley 705, the grass feeding mechanism drive pulley 707 and the straw knotting drive pulley 709 by the same chain. The straw knotting drive pulley 709 delivers the power to the weed discharging pulley 708 and the connecting rod feeding mechanism 706. The cutting swath roller drive belt pulley 505 of the cutting swath threshing and separating device 5 delivers the power to the material delivery device 2, and the conveying channel drive pulley a 201 of the material delivery device 2 is connected with the conveying channel drive pulley b 205 by chain. The conveying channel drive pulley b 205 delivers the power to the cutting platform drive pulley 107 of the material cutting device 1 by chain. The cutting platform drive pulley 107 delivers the power to the feed auger drive pulley 108 and the cutter wobblers 109. The feed auger drive pulley 108 delivers the power to the reel drive pulley 106. The cutting swath drive sprocket 506 delivers the power to the cleaning centrifugal fan 805 and the upper vibrating screen 803. The upper vibrating screen 803 delivers the power to the under vibrating screen 809 and the crank of the shuttle board 8012. The under vibrating screen 809 delivers the power to the grain collecting auger 808 and the varia collecting auger 8010.

Figure 3:
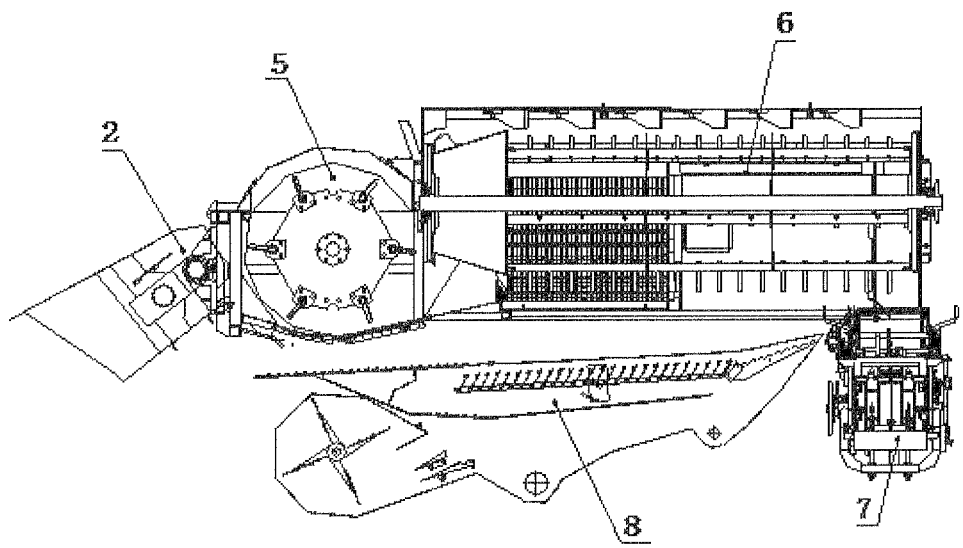
FIG. 3 is the front view of the grain threshing, separating, cleaning and baling structure.

As shown in the FIG. 3, the cutting swath threshing and separating device 5 is arranged breadthwise on the chassis frame member 9, and the longitudinal swath threshing and separating device 6 is arranged lengthways on the chassis frame member 9. The exit of the cutting swath threshing and separating device 5 is connected with the entrance of the longitudinal swath threshing and separating device 6. The transverse center line of the cutting swath threshing and separating device 5 coincides with the longitudinal center line of the longitudinal swath threshing and separating device 6. The rear-end of the material delivery device 2 is connected with the fore-end of the cutting swath threshing and separating device 5. The longitudinal center line of the material delivery device 2 coincides with the transverse center line of the cutting swath threshing and separating device 5. The straw compressing and baling apparatus 7 is located just below the rear-end of the longitudinal swath threshing and separating device 6. The straw feeding mechanism 701 of the straw compressing and baling apparatus 7 is connected with the straw outlet of the longitudinal swath threshing and separating device 6. The grain cleaning apparatus 8 is located just below the cutting swath threshing and separating device 5 and the longitudinal swath threshing and separating device 6. The longitudinal center line of the grain cleaning apparatus 8 parallels to the longitudinal center line of the longitudinal swath threshing and separating device 6. The fore-end of the grain cleaning apparatus 8 is flush with the fore-end of the cutting swath threshing and separating device 5.

Figure 4:
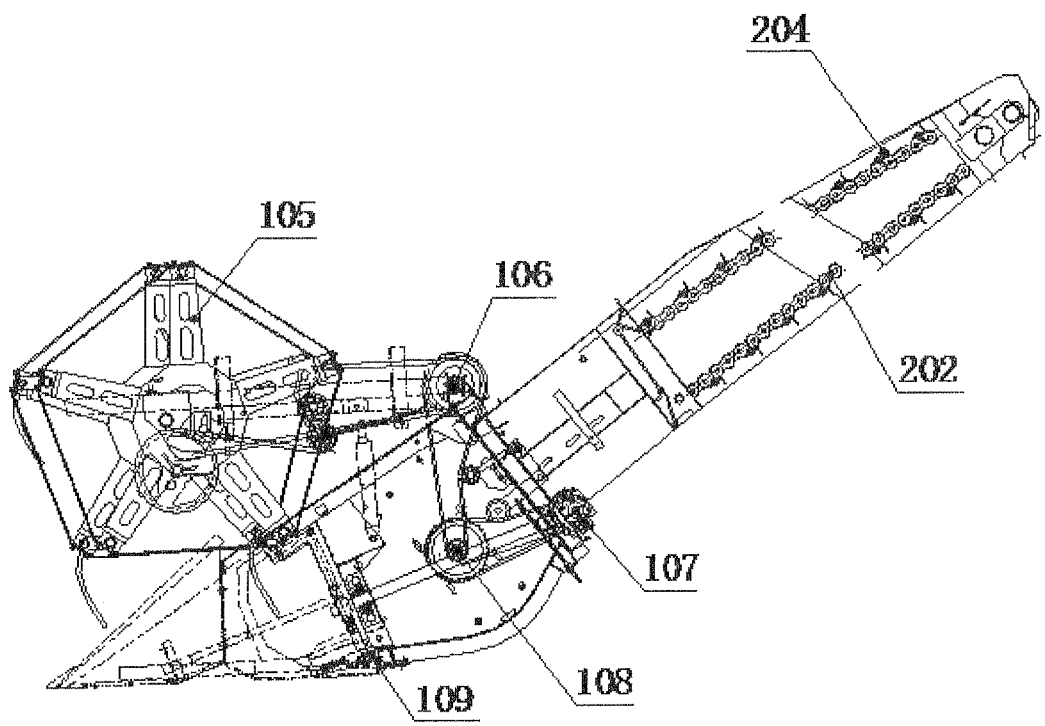
FIG. 4 is the front view of the material cutting, feeding and conveying structure.
Figure 5:
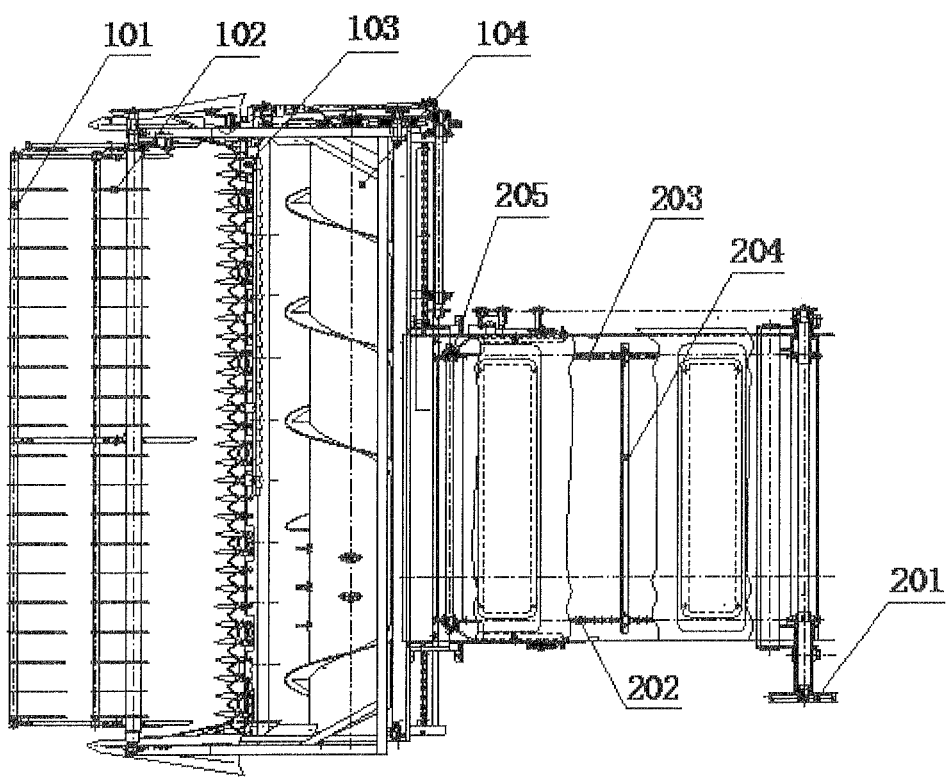
FIG. 5 is the vertical view of the material cutting, feeding and conveying structure.
Figure 6:
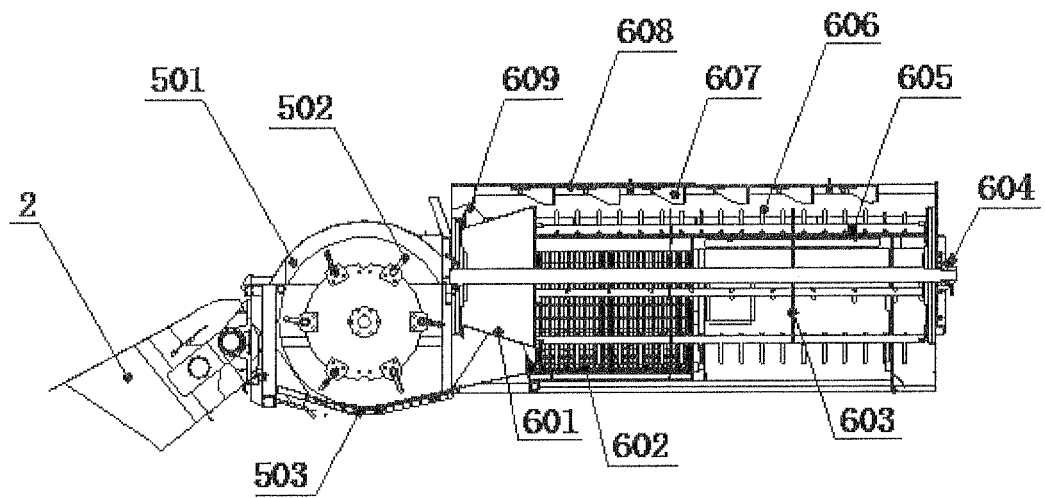
FIG. 6 is the front view of the grain feeding, threshing and separating structure.
Figure 7:
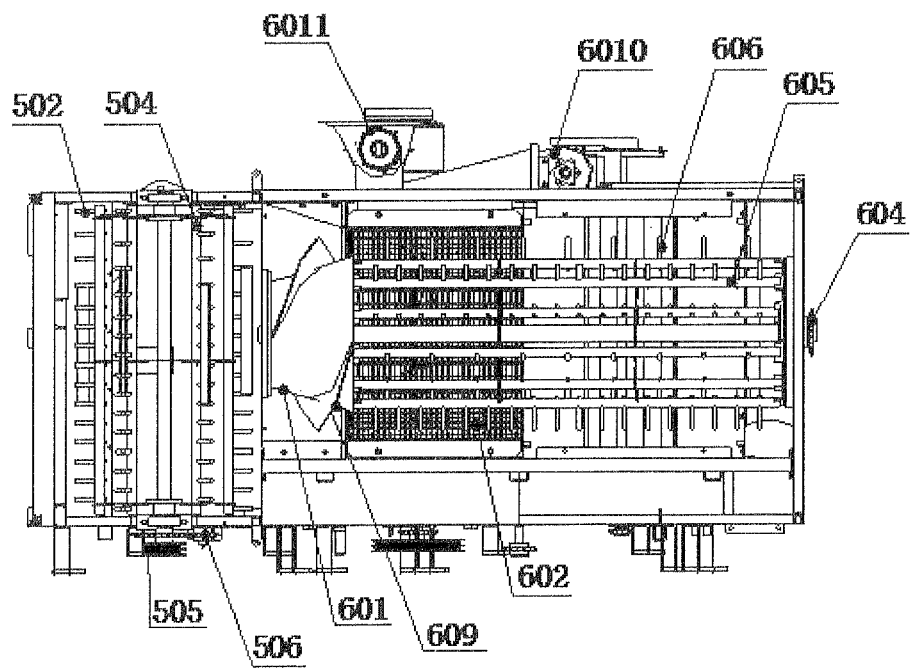
FIG. 7 is the vertical view of the grain feeding, threshing and separating structure.
Figure 8:
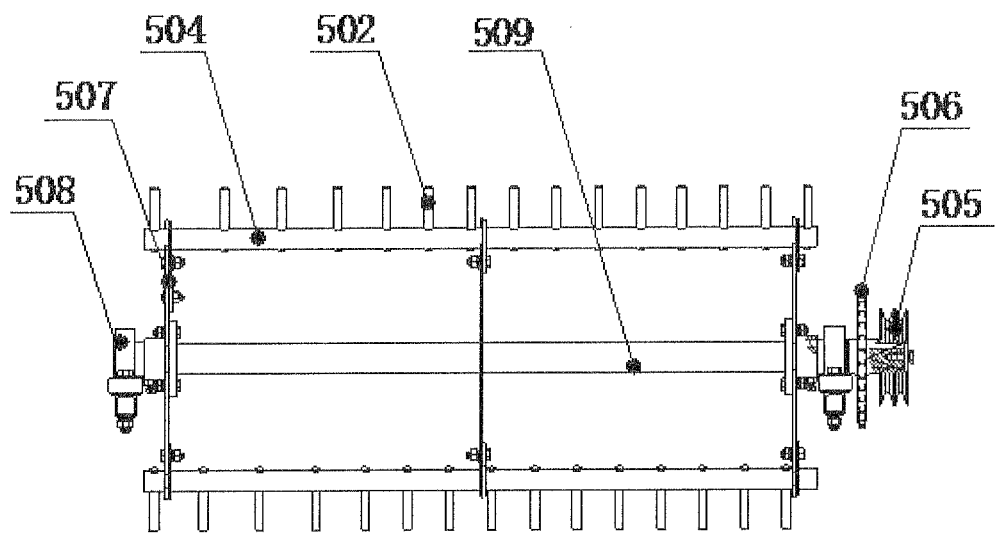
FIG. 8 is the front view of the cutting swath roller structure.
Figure 9:
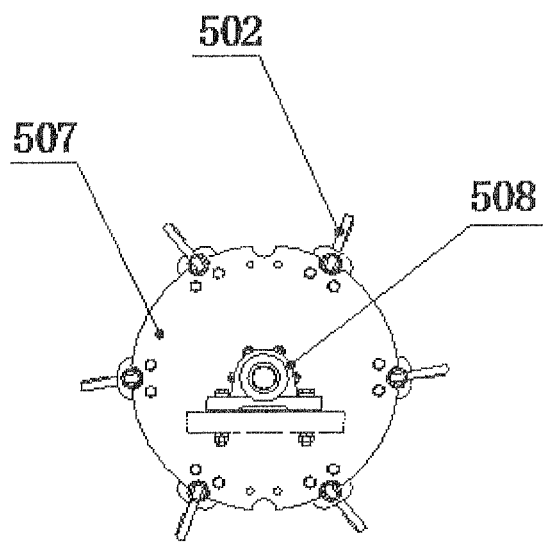
FIG. 9 is the left view of the cutting swath roller structure.
Figure 10:
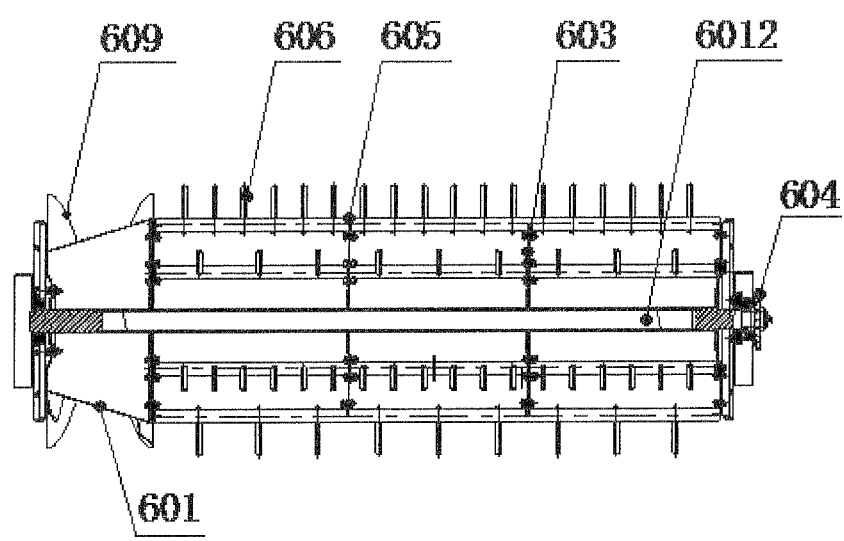
FIG. 10 is the front view of the longitudinal swaths roller structure.
Figure 11:
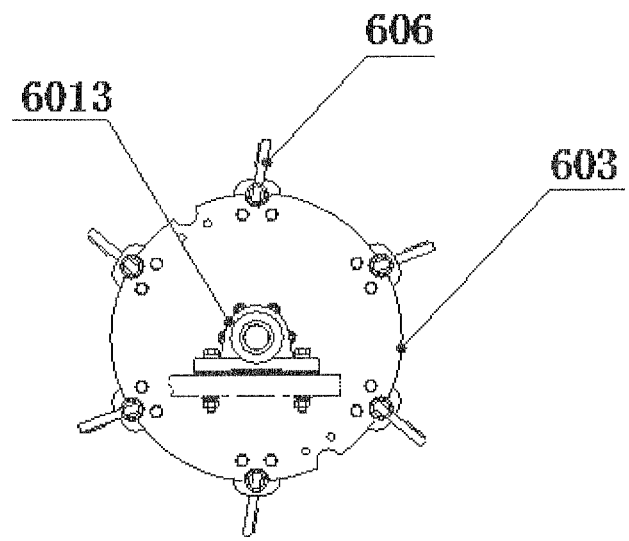
FIG. 11 is the left view of the longitudinal swaths roller structure.

As shown in the FIG. 4 and FIG. 5, the spoke plate of the reel 105 is located above the reciprocating cutter 103. The feed auger drive pulley 108 is located behind the reciprocating cutter 103. The spoke plate of the reel 105 constitutes a triangle with the reciprocating cutter 103 and the section midpoint of the feed auger drive pulley 108. The circumference of the spoke plate of the reel 105 is uniformly connected with five spokes 101. Two spoke plates of the reel 105 are located at both ends of the spokes 101 symmetrically. The teeth 102 are distributed uniformly in the spokes 101 and the teeth top is downward. The angle between the longitudinal center line of the material delivery device 2 and the horizontal is 25°~45°. The fore-end of the material delivery device 2 is connected with the material cutting device 1. The rear-end of the material delivery device 2 is connected with the cutting swath threshing and separating device 5. The conveying chain a 202 and the conveying chain b 203 are closed type, sheathing on the shaft ends of the conveying channel drive pulley a 201 and the conveying channel drive pulley b 205. The material battens 204 are linked uniformly on the conveying channel drive pulley a 201 and the conveying channel drive pulley b 205. The feed auger drive pulley 108 is located in the back of the reciprocating cutter 103 0.8 m~1.2 m, and the feed auger drive pulley 108 is located above the reciprocating cutter 103 0.2 m~0.3 m. The spoke plate of the reel 105 is located above the reciprocating cutter 103 1.2 m~1.6 m, and the spoke plate of the reel 105 is located in the front of the reciprocating cutter 103 0.6 m~1.2 m. The spoke plate of the reel 105 is pentagon, and its external diameter is 1.5 m~2.0 m, and its spoke 101 length is 3 m~4 m and the tooth 102 length is 0.015 m~0.02 m. The circumference of the conveying chain a 202 and the conveying chain b 203 is 3.5 m~4.5 m. The center distance between the conveying channel drive pulley a 201 and the conveying channel drive pulley b 205 is 1.6 m~2.0 m. The distribution distance of the material battens 204 on the conveying channel drive pulley a 201 and the conveying channel drive pulley b 205 is 0.02 m~0.035 m.

As shown in the FIG. 6, FIG. 7, FIG. 8 and FIG. 9, the fore-end of the cutting swath threshing and separating device 5 is connected with the rear-end of the material delivery device 2, and the rear-end of the cutting swath threshing and separating device 5 is connected with the fore-end of the longitudinal swath threshing and separating device 6. There is a cutting swath roller cover plate 501 on the top of the cutting swath threshing and separating device 5, and a cutting swath grid concave sieve 503 on the bottom. The cutting swath roller cover plate 501 and the cutting swath grid concave sieve 503 constitute the threshing and separating cavity of the cutting swath threshing and separating device 5 together. The cutting swath spokes 504 and the cutting swath spike teeth threshing unit 502 are located inside the threshing and separating cavity. The cutting swath roller bearings 508 are installed on the cutting swath roller spoke plate 507 at both ends of the cutting swath roller axle 509. One cutting swath roller bearing 508 installs cutting swath roller drive belt pulley 505 and cutting swath drive sprocket 506, and the cutting swath drive sprocket 506 is in the middle of the cutting swath roller drive belt pulley 505. Three cutting swath roller spoke plates 507 are installed on the cutting swath roller axle 509 uniformly, and six cutting swath spokes 504 are installed on the circumference of the three cutting swath roller spoke plates 507 uniformly. The cutting swath spike teeth threshing units 502 are installed on the cutting swath spokes 504 uniformly. The length of the cutting swath roller axle 509 is 1.2 m~1.5 m, and the external diameter of the cutting swath roller spoke plate 507 is 0.4 m~0.6 m, and the height of the cutting swath spike teeth threshing unit 502 is 0.055 m~0.075 m. The distribution distance of the cutting swath spike teeth threshing unit 502 installed on the cutting swath spokes 504 is 0.08 m~0.12 m.

As shown in the FIG. 6, FIG. 7, FIG. 10 and FIG. 11, the fore-end of the longitudinal swath threshing and separating device 6 is connected with the cutting swath threshing and separating device 5. The rear-end of the longitudinal swath threshing and separating device 6 is connected with The straw compressing and baling apparatus 7. The angle between the longitudinal axis of the longitudinal swath threshing and separating device 6 and the horizontal is 3°~5°. The longitudinal swath roller axel 6012 installs longitudinal swath drive pulley 604. Two longitudinal swath roller bearings 6013 are installed on the both ends of the longitudinal swath roller axel 6012. The top cap deflector 607 is above the longitudinal swath threshing and separating device 6, and the longitudinal swath roller grid concave sieve 602 is beside the longitudinal swath threshing and separating device 6. The top cap deflector 607 and the longitudinal swath roller grid concave sieve 602 constitute the threshing and separating cavity of the longitudinal swath threshing and separating device 6. The spiral feeding head 601 is located in front of the threshing and separating cavity. The longitudinal swath spoke plate 603 is located behind the threshing and separating cavity. Four longitudinal swath spoke plates 603 are installed on the longitudinal swath roller axel 6012 uniformly. And six cutting swath spokes 605 are installed on the circumference of the four longitudinal swath spoke plates 603. The longitudinal swath spike teeth threshing units 606 are installed on the longitudinal swath spokes 605 uniformly, and they are located inside the threshing and separating cavity of the longitudinal swath threshing and separating device 6. The spiral feeding head 601 is installed on the longitudinal swath spoke plate 603 of the longitudinal swath roller axel 6012. The spiral feeding head 601 installs four pieces of feeding spiral blades 609. The length of the longitudinal swath roller axel 6012 is 2.5 m~3.5 m, and the external diameter of the longitudinal swath spoke plate 603 is 0.4 m~0.6 m. The distribution distance of the longitudinal swath spike teeth threshing unit 606 installed on the longitudinal swath spokes 605 is 0.12 m~0.15 m. The spiral feeding head 601 is frustum cone-like, and its maximal external diameter is 0.4 m~0.6 m, and its minimal external diameter is 0.2 m~0.4 m. The height of the spiral feeding head is 0.035 m~0.045 m. The outboard height of the feeding spiral blade 609 is flush with the outboard height of the longitudinal swath spike teeth threshing unit 606.

Figure 12:
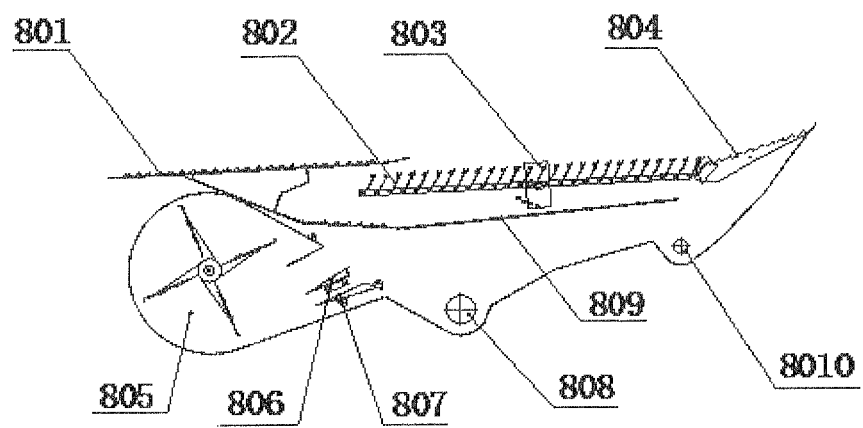
FIG. 12 is the front view of the grain cleaning apparatus.
Figure 13:
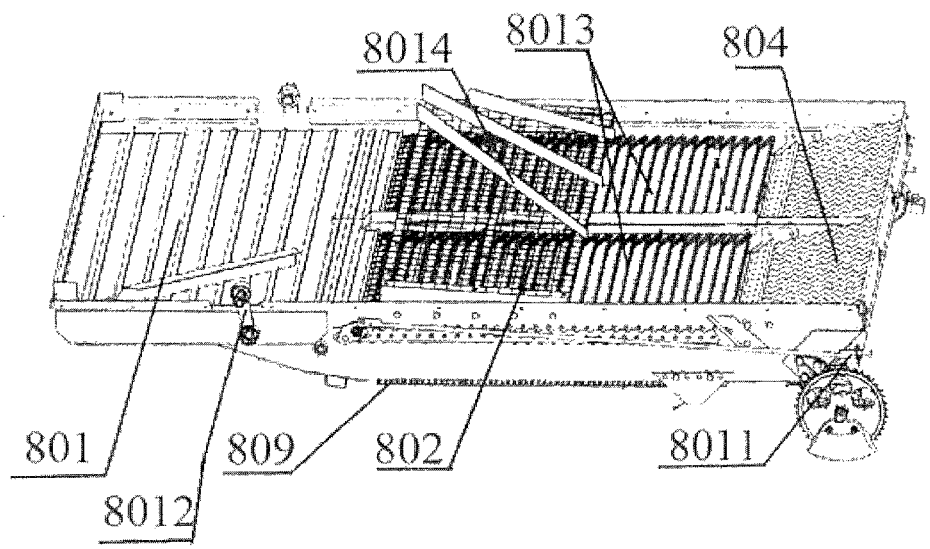
FIG. 13 is the vertical view of the grain cleaning apparatus.

As shown in the FIG. 12 and FIG. 13, the grain cleaning apparatus is located just below the grain cleaning apparatus 5 and the longitudinal swath threshing and separating device 6. The upper vibrating screen 803 is located above the under vibrating screen 809. The shuttle board 801 is located above and in the front of the upper vibrating screen 803. The sawtooth vibrating tail screen 804 is located at the rear-end of the upper vibrating screen 803. The sieve plate 802 is located at the fore-end of the upper vibrating screen 803. The upside of the sieve plate 802 installs 3~5 pieces of scalping boards 804. The cleaning centrifugal fan 805 is located just below the shuttle board 801. The front of the cleaning centrifugal fan 805 is flush with the front of the shuttle board 801. The rear-end of the cleaning centrifugal fan 805 is flush with the front of the upper vibrating screen 803. The under vibrating screen 809 is located on the centre line of the cleaning centrifugal fan 805. There are under draught distributing board 806 and top draught distributing board 807 at their outlet of the cleaning centrifugal fan 805. The extension line of the top draught distributing board 807 passes through the center of the upper vibrating screen 803. The extension line of the under draught distributing board 806 intersects with the rear of the under vibrating screen 809. The grain collecting auger 808 is installed at the downside ¼ position of the under vibrating screen 809. The varia collecting auger 8010 is installed at the rear downside of the under vibrating screen 809. The grain collecting auger 808 is flush with the bottom of the cleaning centrifugal fan 805. The varia collecting auger 8010 is connected with the cleaning varia auger 6010 and the rethreshing auger 6011. The rear end of the rethreshing auger 6011 is located above the shuttle board 801 and connected with the longitudinal swath threshing and separating device 6. The under vibrating screen 809 uses a structure of woven screen 8013. The length of the grain cleaning apparatus 8 is 2.0 m~2.5 m, width is 1.2 m~1.5 m, height is 0.6 m~0.8 m. The distance between the shuttle board 801 and the upper vibrating screen 803 is 0.05 m~0.10 m. The rear end of the shuttle board 801 overlaps 0.5 m~0.8 m with the upper vibrating screen 803. The upper vibrating screen 803 is located 0.10 m~0.15 m above the under vibrating screen 809. The external width of the upper vibrating screen 803 and the under vibrating screen 809 is 1.2 m~1.5 m.

Figure 14:
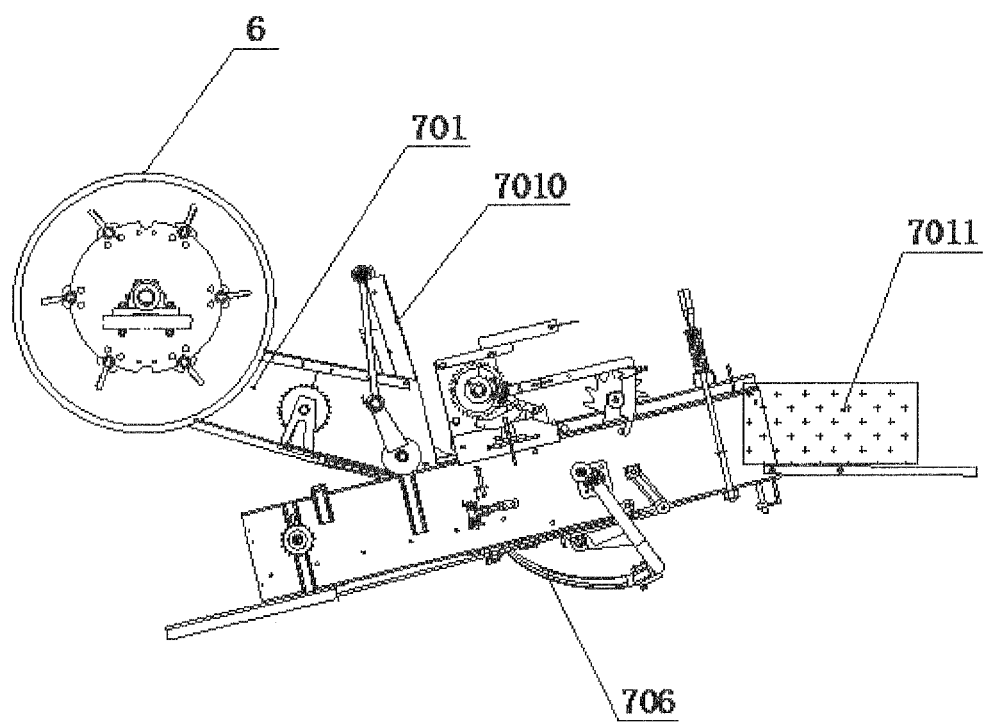
FIG. 14 is the front view of the connection of the grain threshing and the stalk compressing and baling device.
Figure 15:
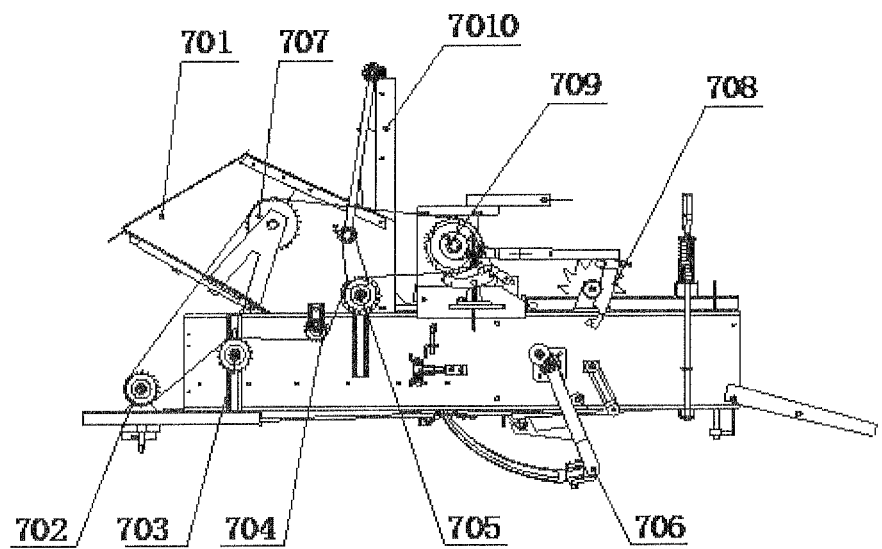
FIG. 15 is the front view of the stalk compressing and baling device.
Figure 16:
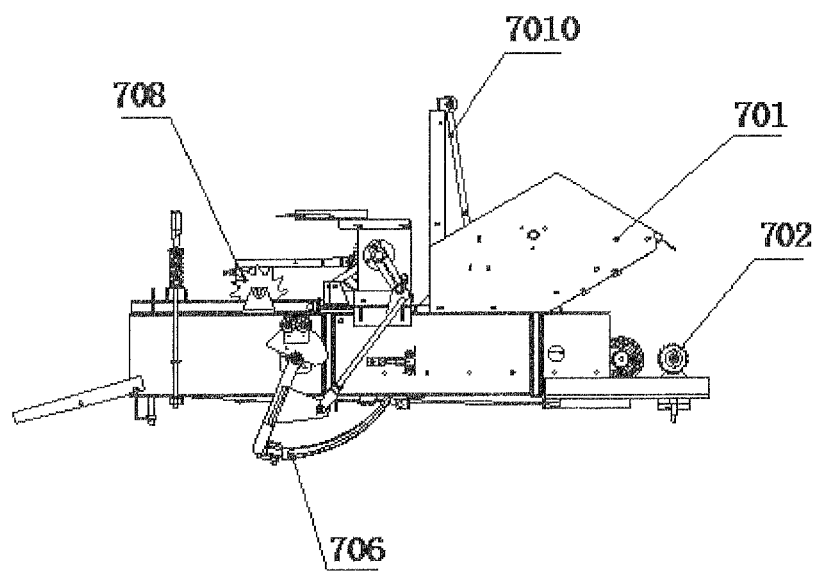
FIG. 16 is the back view of the stalk compressing and baling device.

As shown in the FIG. 14, FIG. 15 and FIG. 16, the straw compressing and baling apparatus 7 is connected with longitudinal swath threshing and separating device 6, installed on the chassis platform frame 902. The power input mechanism 702 transmits power to the grass feeding mechanism drive pulley 707, the straw knotting drive pulley 709 and the pre press mechanism drive pulley 705 by the same chain. The drive pulley 704 and the baling drive tensioning wheel 703 are installed between the power input mechanism 702 and the pre press mechanism drive pulley 705. The grass feeding mechanism drive pulley 707 is installed at the middle of the straw feeding mechanism 701. The straw feeding mechanism 701 transmits straw by using chain harrow. The pre press mechanism drive pulley 705 transmits power to the crank pre pressing mechanism 7010, and the crank pre pressing mechanism 7010 compresses the straw. The straw knotting drive pulley 709 is installed at the rear of the straw feeding mechanism 701, and the straw knotting drive pulley 709 bales and knots the compressed square straw block. The weed discharging pulley 708 is installed at the top of the square bale discharging mechanism 708. Then the connecting rod feeding mechanism 706 cuts off the compressed knotted square straw bale and extracts it out of the square bale discharging mechanism 7011. The total length of The straw compressing and baling apparatus 7 is 2.0 m~2.5 m, and width is 0.5 m~0.7 m, and height is 0.8 m~1.2 m. The angle between the straw feeding mechanism 701 and the main body of The straw compressing and baling apparatus 7 is 20°~30°, and The angle between the main body of The straw compressing and baling apparatus 7 and the horizontal is 10°~15°.

Figure 17:
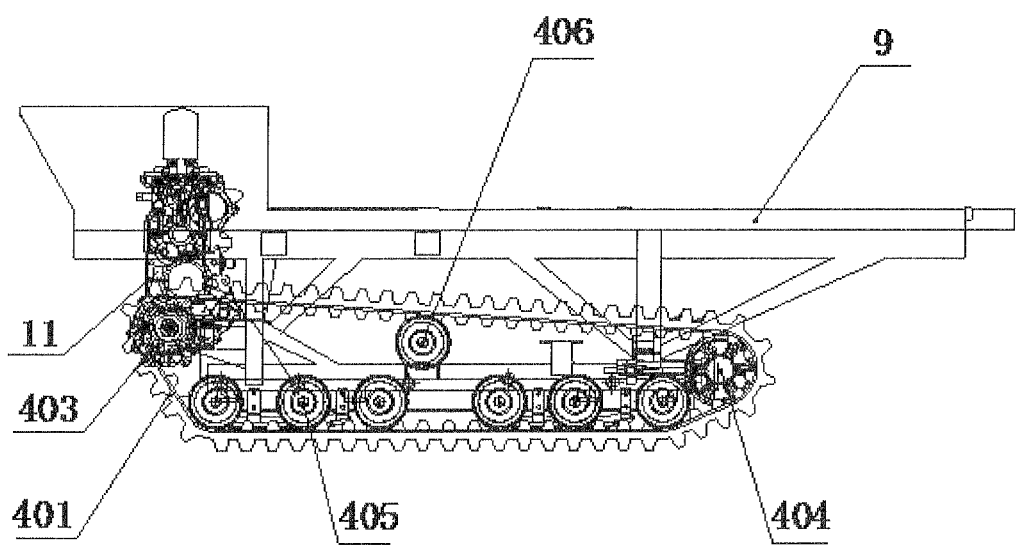
FIG. 17 is the front view of the chassis travelling system of the combination.
Figure 18:
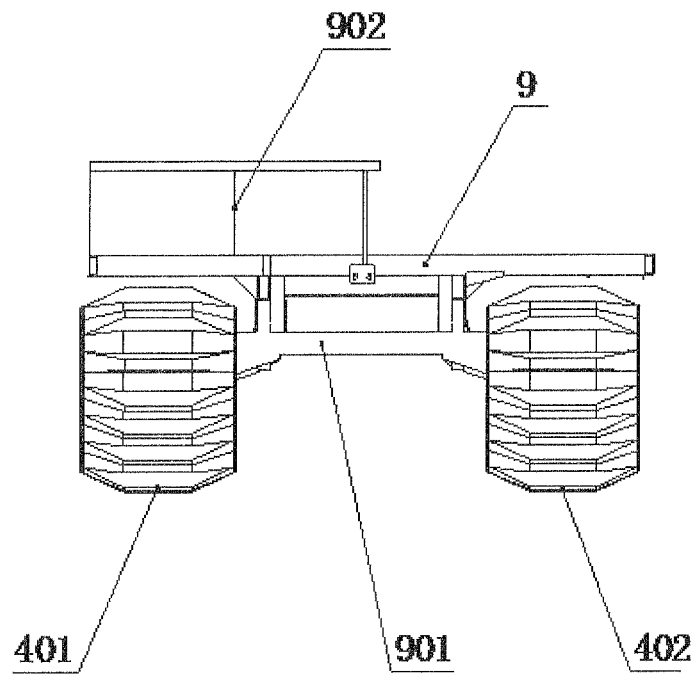
FIG. 18 is the right View of the chassis travelling system of the combination.

As shown in the FIG. 17 and FIG. 18, the engine 10 is located at the chassis frame member 9. The chassis platform frame 902 is connected with the chassis supporting frame 901. And the chassis supporting frame 901 is connected with the caterpillar band walking system 4. There are caterpillar band a 401 and caterpillar band b 402 installed at the two sides of the chassis supporting frame 901. There are supporting rollers 406 installed at the top of the caterpillar band a 401 and the caterpillar band b 402, drive pulleys 403 at the front, guide pulleys 404 at the rear, and six thrust wheels 405 at the middle. The speed variator 11 is connected with the engine 10 and the drive pulley 403. The width of the chassis frame member 9 is 2.0 m~2.5 m, and length is 2.5 m~3.5 m, and height is 0.5 m~0.6 m. The height of the caterpillar band a 401 and caterpillar band b 402 is 0.4 m~0.6 m, and length is 2.0 m~2.5 m, and width is 0.4 m~0.5 m.

Figure 19:
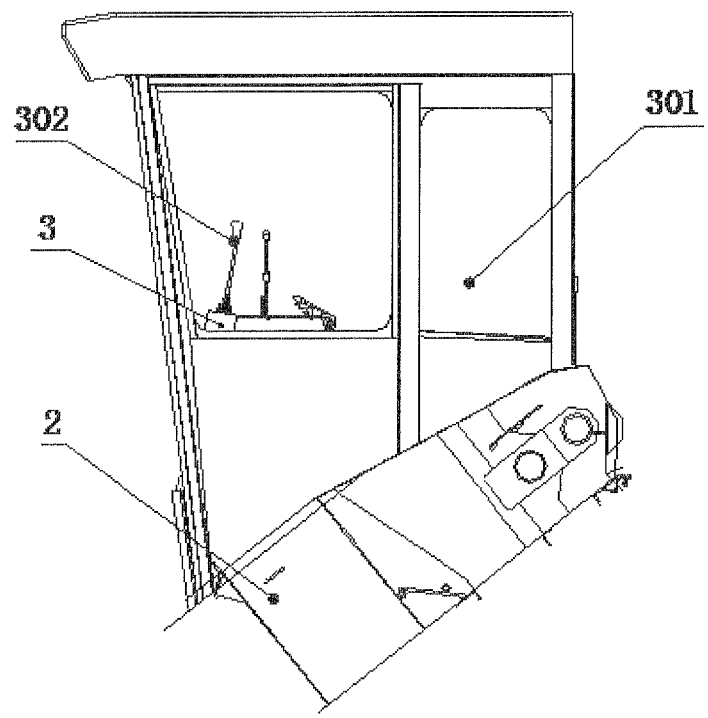
FIG. 19 is the front view of the driving operating unit.

As shown in the FIG. 19, the driving system is located over the material delivery device 2. The rear-end of the dricab 301 is flush with the material delivery device 2. The operating arm controls the working state of the material delivery device 2, caterpillar the band walking system 4, the cutting swath threshing and separating device 5, the longitudinal swath threshing and separating device 6, The straw compressing and baling apparatus 7, the grain cleaning apparatus 8, the chassis frame member 9 and the grain storage box 12. The operating handle of the engine 10 is installed in the dricab 301. The distance between the top of the dricab 301 and the upside of the chassis frame member 9 is 2.0 m~2.5 m. The longitudinal length of the dricab 301 along the chassis frame member 9 is 1.5 m~2.0 m, and the transverse width is 2.0 m~2.5 m.

The concrete implement process of harvesting and baling rice and wheat of a cutting longitudinal swaths grain harvesting and baling combine of the specific model is as follows. The operator starts the engine 10 by controlling the operating arm 302 of the driving system 3 in the dricab 301. Then the engine 10 transmits power to the material cutting device 1, material delivery device 2, caterpillar band walking system 4, cutting swath threshing and separating device 5, longitudinal swath threshing and separating device 6, a straw compressing and baling apparatus 7 and grain cleaning apparatus 8 respectively. During harvest in the field, the straw is cut by the reciprocating cutter 103 of the material cutting device 1, then the feed auger 104 feeds the grain into the material delivery device 2. And the material battens 204 compact the straw, then deliver the straw to the cutting swath threshing and separating device 5 with the function of the conveying chain a 202 and conveying chain b 203, then the cutting swath spike teeth threshing unit 502 threshes the grain. Then the threshed and separated grain is separated on the cutting swath grid concave sieve 503, the threshed and separated straw in the cutting swath threshing and separating device 5 is delivered into longitudinal swath threshing and separating device 6. Under the grabbing action of the feeding spiral blade 609 on the spiral feeding head 601, the straw is rethreshed with the function of the longitudinal swath spike teeth threshing unit 606. The threshed grain is separated by the longitudinal swath roller grid concave sieve 602. The threshed and separated straw is compacted and baled by The straw compressing and baling apparatus 7. The straw is compacted with the function of the crank pre pressing mechanism 7010 after fed by the straw feeding mechanism 701. Then the straw is compacted into square bale and bound in the square bale discharging mechanism 7011. Then the square bale is discharged from the machine with the function of the connecting rod feeding mechanism 706 and weed discharging pulley 708. The mixture filtered out of the cutting swath grid concave sieve 503 and longitudinal swath roller grid concave sieve 602 is cleaned in the grain cleaning apparatus 8. The mixture is layered on the shuttle board 801 and scalping board 8014 and then fed to the upper vibrating screen 803, then filtered by the sieve plate 802 and sawtooth vibrating tail screen 804. The varia is discharged from the machine with the function of the cleaning centrifugal fan 805. The cleaning air current of the cleaning centrifugal fan 805 can be regulated by the under draught distributing board 806 and top draught distributing board 807. The grain filtered out of the upper vibrating screen 803 is cleaned again on the under vibrating screen 809 to get rid of the imperfect grain. The uncleaned earhead is delivered to the longitudinal swath threshing and separating device 6 to be rethreshed after cleaned in the grain cleaning apparatus 8. The pure grain is gathered by the grain collecting auger 808 and delivered into the grain storage box 12 after cleaned in the grain cleaning apparatus 8.

A cutting longitudinal swaths grain harvesting and baling combine of the specific model, by using the newly designed cutting longitudinal swaths grain threshing and separation system, it can achieve the threshing and separating function for rice and wheat of high water ratio, and its work efficiency is higher 40%~60% than other grain threshing and separation systems under the same configuration parameters. The cutting longitudinal swaths grain threshing and separation system is compact, which can be installed at medium and small sized combine harvesters, having advantages such as simple structure, high threshing and separating efficiency and low grain loss rate. By using the newly designed grain cleaning apparatus, the cleaning centrifugal fan divides their outlet current into a few beams of currents with pieces of draught distributing board, making their current distribution on the sieve more reasonable. By using the newly designed shuttle board, upper vibrating screen and under vibrating screen, its structure can match with the cutting longitudinal swaths grain threshing and separation system dexterously, and can overcome the difficulty of conventional air-screen cleaning devices failing to solve the problems of high loss rate and low cleanliness. By using the newly designed a chassis travelling system and caterpillar band walking system, the drive pulley, guide pulley, thrust wheel and riding wheel match with the caterpillar band of the caterpillar band walking system, which can walk on wet land freely and have advantage of strong flexibility in small plots of wet and soft. The maximum forward speed of the caterpillar band walking system can match with the work efficiency of the grain cutting and conveying system, the grain threshing and separation system and the grain cleaning apparatus. The present invention achieves the integrated compound operation of rice and wheat harvesting and baling, which can reduce working procedure, decrease the cost of gathering stalks, and reduce the input of manpower and energy consumption. It can provide straw burning raw material for new energy enterprise and food raw material for livestock breeding industry by compressing and baling stalks. It is propitious to build a conservation-minded society, decreases environmental pollution, and reduces working hours, which is extremely favorable to grab farming season without affecting the subsequent agricultural production. Farmers compress, bale and sell stalks by using the machine in time, which can increase income and grab farming season, improving production efficiency and economic benefits.

The invention claimed is:

1. A cutting longitudinal swaths grain harvesting and baling combine, which comprises: a grain cutting and conveying system, a grain threshing and separation system, a grain cleaning apparatus, a grain collection and holding system, a straw compressing and baling apparatus, a chassis travelling system and a driving system, wherein the grain cleaning apparatus is located over the chassis travelling system, the grain threshing and separation system is located over the grain cleaning apparatus, the straw compressing and baling apparatus is located under the grain threshing and separation system and at the rear-end of the grain cleaning apparatus, the grain cutting and conveying system is located at the fore-end of the grain threshing and separation system, the driving system is located above the grain cutting and conveying system, and the grain collection and holding system is located above the chassis travelling system and beside the grain threshing and separation system;

wherein the grain cutting and conveying system comprises a material cutting device and material delivery device; the material cutting device is connected with the material delivery device, and the former is located in front of the latter; the material cutting device comprises spokes, teeth, a reciprocating cutter, a feed auger, a spoke plate of the reel, a reel drive pulley, a cutting platform drive pulley, a feed auger drive pulley and cutter wobblers; wherein the teeth are connected with the spokes, and the spokes are connected with the spoke plate of the reel; the spoke plate of the reel is located above the feed auger, the reciprocating cutter is located under the spoke plate of the reel and in front of the feed auger, the reel drive pulley is connected with the spoke plate of the reel, and the feed auger drive pulley is connected with the feed auger, the cutter wobblers are connected with the reciprocating cutter, and the cutting platform drive pulley is connected with the feed auger drive pulley; the material delivery device comprises a driving wheel of a first conveying channel, a first conveying chain, a second conveying chain, material battens and a driving wheel of a second conveying channel; the first conveying chain and the second conveying chain are located outside the first conveying channel drive pulley and the second conveying channel drive pulley; the material battens are located outside the first conveying chain and the second conveying chain;

the grain threshing and separation system comprises a cutting swath threshing and separating device and a longitudinal swath threshing and separating device; the cutting swath threshing and separating device comprises a cutting swath roller cover plate, a cutting swath spike teeth threshing unit, a cutting swath grid concave sieve, cutting swath spokes, a cutting swath roller drive belt pulley, a cutting swath drive sprocket, a cutting swath roller spoke plate, a cutting swath roller bearing and a cutting swath roller axle; the cutting swath spike teeth threshing unit is connected with the cutting swath spokes, the cutting swath spokes are connected with the cutting swath roller spoke plate, the cutting swath roller spoke plate is connected with the cutting swath roller bearing, and the cutting swath roller bearing is connected with the cutting swath roller axle; the cutting swath roller drive belt pulley and the cutting swath drive sprocket are connected with the cutting swath roller axle; the cutting swath roller cover plate is located above the cutting swath roller spoke plate, and the cutting swath grid concave sieve is located under the cutting swath roller spoke plate; the longitudinal swath threshing and separating device comprises a spiral feeding head, a longitudinal swath roller grid concave sieve, a longitudinal swath spoke plate, a longitudinal swath drive pulley, longitudinal swath spokes, a longitudinal swath spike teeth threshing unit, a top cap deflector, a longitudinal swath roller top cap, a feeding spiral blade, a rethreshing auger, a longitudinal swath roller axel and a longitudinal swath roller bearing; the feeding spiral blade is located outside the spiral feeding head, the spiral feeding head is connected with the longitudinal swath spokes, the longitudinal swath spokes are connected with the longitudinal swath spoke plate, the longitudinal swath spoke plate is connected with the longitudinal swath roller axel, the longitudinal swath drive pulley is connected with the longitudinal swath roller axel, the longitudinal swath roller bearing is connected with longitudinal swath roller axel; the top cap deflector is connected with the longitudinal swath roller top cap and located inside it, the longitudinal swath roller top cap is located above the longitudinal swath spoke plate, the longitudinal swath roller grid concave sieve is located under the longitudinal swath spoke plate, and the rethreshing auger is connected with the longitudinal swath roller grid concave sieve;

the grain cleaning apparatus comprises a shuttle board, an upper vibrating screen, an under vibrating screen and a cleaning centrifugal fan, the shuttle board is located above the upper vibrating screen, and the upper vibrating screen is located above the under vibrating screen, the cleaning centrifugal fan is located under the upper vibrating screen, and also is located above and in front of the under vibrating screen, a cleaning varia auger is located above the shuttle board; the upper vibrating screen comprises a scalping board, a sieve plate and a sawtooth vibrating tail screen; the scalping board is located above the sieve plate, and the sieve plate is located in front of the sawtooth vibrating tail screen; the under vibrating screen comprises a woven screen and a vibrating screen flywheel; the cleaning centrifugal fan comprises an under draught distributing board and a top draught distributing board a crank of the shuttle board is connected with the shuttle board, and the vibrating screen flywheel is connected with the crank of the shuttle board;

the grain collection and holding system comprises a grain storage box, a grain collecting auger and a varia collecting auger; the grain collecting auger is connected with the grain storage box, the varia collecting auger is connected with the longitudinal swath threshing and separating device;

the straw compressing and baling apparatus comprises a straw feeding mechanism, a power input mechanism, a baling drive tensioning wheel, a drive pulley, a pre press mechanism drive pulley, a connecting rod feeding mechanism, a grass feeding mechanism drive pulley, a weed discharging pulley, a straw knotting drive pulley, a crank pre pressing mechanism and a square bale discharging mechanism; the straw feeding mechanism is connected with the square bale discharging mechanism, the crank pre pressing mechanism is connected with the straw feeding mechanism, the connecting rod feeding mechanism is connected with the square bale discharging mechanism; the pre press mechanism drive pulley is connected with the crank pre pressing mechanism, the grass feeding mechanism drive pulley is connected with the square bale discharging mechanism, the straw knotting drive pulley is connected with the square bale discharging mechanism; the power input mechanism, the baling drive tensioning wheel, the drive pulley, the pre press mechanism drive pulley, the grass feeding mechanism drive pulley, the weed discharging pulley and the straw knotting drive pulley are connected with each other;

the chassis travelling system comprises a caterpillar band walking system, a chassis frame member, an engine and a speed variator; the caterpillar band walking system is connected with the bottom of the chassis frame member, the engine is connected with the caterpillar band walking system through the speed variator; the caterpillar band walking system comprises a first caterpillar band, a second caterpillar band, a drive pulley, a guide pulley, a thrust wheel and a riding wheel; the drive pulley, the guide pulley, the thrust wheel and the riding wheel are located inside the first caterpillar band and the second caterpillar band; the chassis frame member comprises a chassis supporting frame and a chassis platform frame; the chassis supporting frame is connected with the top of the chassis platform frame; and the driving system comprises a dricab and an operating arm.

2. The cutting longitudinal swaths grain harvesting and baling combine according to claim 1, wherein the cutting swath threshing and separating device is disposed transversally on the chassis frame, and the longitudinal swath threshing and separating device is longitudinally disposed on the chassis frame, the exit of the cutting swath threshing and separating device is connected with the entrance of the longitudinal swath threshing and separating device, the transverse center line of the cutting swath threshing and separating device, coincides with the longitudinal center line of the longitudinal swath threshing and separating device; the rear-end of the material delivery device is connected with the fore-end of the cutting swath threshing and separating device, the longitudinal center line of the material delivery device coincides with the transverse center line of the cutting swath threshing and separating device; the straw compressing and baling apparatus is located just below the rear-end of the longitudinal swath threshing and separating device, the straw feeding mechanism of the straw compressing and baling apparatus is connected with the straw outlet of the longitudinal swath threshing and separating device; the grain cleaning apparatus is located just below the cutting swath threshing and separating device and the longitudinal swath threshing and separating device, the longitudinal center line of the grain cleaning apparatus parallels to the longitudinal center line of the longitudinal swath threshing and separating device, the fore-end of the grain cleaning apparatus is flush with the fore-end of the cutting swath threshing and separating device.

3. The cutting longitudinal swaths grain harvesting and baling combine according to claim 1, wherein the spoke plate of the reel is located above the reciprocating cutter, the feed auger drive pulley is located behind the reciprocating cutter, the spoke plate of the reel constitutes a triangle with the reciprocating cutter and the section midpoint of the feed auger drive pulley; the circumference of the spoke plate of the reel is uniformly connected with five spokes, two spoke plates of the reel are located at both ends of the spokes symmetrically, the teeth are distributed uniformly in the spokes and the teeth top is downward; an angle between the longitudinal center line of the material delivery device and the horizontal is 25°~45°, the fore-end of the material delivery device is connected with the material cutting device, and the rear-end of the material delivery device is connected with the cutting swath threshing and separating device; the first conveying chain and the second conveying chain are closed type, sheathing on the shaft ends of the first conveying channel drive pulley and the second conveying channel drive pulley, the material battens are linked uniformly on the first conveying channel drive pulley and the second conveying channel drive pulley.

4. The cutting longitudinal swaths grain harvesting and baling combine according to claim 3, wherein the feed auger drive pulley is located in the back of the reciprocating cutter 0.8 m~1.2 m, and the feed auger drive pulley is located above the reciprocating cutter 0.2 m~0.3 m; the spoke plates of the reel are located in front of the reciprocating cutter 0.6 m~1.2 m; the spoke plate of the reel is pentagon, and its external diameter is 1.5 m~2.0 m; and its spoke length is 3 m~4 m and the tooth length is 0.015 m~0.02 m; the circumference of the first conveying chain and the second conveying chain is 3.5 m~4.5 m, the center distance between the first conveying channel drive pulley and the second conveying channel drive pulley is 1.6 m~2.0 m, a distribution distance of the material battens on the first conveying channel drive pulley and the second conveying channel drive pulley is 0.02 m~0.035 m.

5. The cutting longitudinal swaths grain harvesting and baling combine according to claim 1, wherein the fore-end of the cutting swath threshing and separating device is connected with the rear-end of the material delivery device, the rear-end of the cutting swath threshing and separating device is connected with the fore-end of the longitudinal swath threshing and separating device; the cutting swath roller cover plate is above the cutting swath threshing and separating device and the cutting swath grid concave sieve under it; the cutting swath roller cover plate and the cutting swath grid concave sieve constitute a threshing and separating cavity of the cutting swath threshing and separating device together, the cutting swath spokes and the cutting swath spike teeth threshing unit are located inside the threshing and separating cavity; the cutting swath roller bearings are installed on the cutting swath roller spoke plate at both ends of the cutting swath roller axle, one cutting swath roller bearing is installed adjacent to the cutting swath roller drive belt pulley and cutting swath drive sprocket, and the cutting swath drive sprocket is in the middle of the cutting swath roller drive belt pulley; three cutting swath roller spoke plates are installed on the cutting swath roller axle uniformly, and six cutting swath spokes are installed on the circumference of the three cutting swath roller spoke plates uniformly, the cutting swath spike teeth threshing units are installed on the cutting swath spokes uniformly.

6. The cutting longitudinal swaths grain harvesting and baling combine according to claim 5, wherein the length of the cutting swath roller axle is 1.2 m~1.5 m, and the external diameter of the cutting swath roller spoke plate is 0.4 m~0.6 m, and the height of the cutting swath spike teeth threshing unit is 0.055 m~0.075 m, a distribution distance of the cutting swath spike teeth threshing unit installed on the cutting swath spokes is 0.08 m~0.12 m.

7. The cutting longitudinal swaths grain harvesting and baling combine according to claim 1, wherein the fore-end of the longitudinal swath threshing and separating device is connected with the cutting swath threshing and separating device, the rear-end of the longitudinal swath threshing and separating device is connected with the straw compressing and baling apparatus, an angle between the longitudinal axis of the longitudinal swath threshing and separating device and the horizontal is 3°~5°; the longitudinal swath roller axle connects to the longitudinal swath drive pulley, two longitudinal swath roller bearings are installed on the both ends of the longitudinal swath roller axel; the top cap deflector is above the longitudinal swath threshing and separating device, and the longitudinal swath roller grid concave sieve is beside the longitudinal swath threshing and separating device, the top cap deflector and the longitudinal swath roller grid concave sieve constitute a threshing and separating cavity of the longitudinal swath threshing and separating device; the spiral feeding head is located in front of the threshing and separating cavity, the longitudinal swath spoke plate is located behind the threshing and separating cavity; four longitudinal swath spoke plates are installed on the longitudinal swath roller axel uniformly, and six longitudinal swath spokes are installed on the circumference of the four longitudinal swath spoke plates, the longitudinal swath spike teeth threshing units are installed on the longitudinal swath spokes uniformly, and they are located inside the threshing and separating cavity of the longitudinal swath threshing and separating device; the spiral feeding head is installed on the longitudinal swath spoke plate of the longitudinal swath roller axel, the spiral feeding head installs four pieces of feeding spiral blades.

8. The cutting longitudinal swaths grain harvesting and baling combine according to claim 7, wherein the length of the longitudinal swath roller axel is 2.5 m~3.5 m, and the external diameter of the longitudinal swath spoke plate is 0.4 m~0.6 m, a distribution distance of the longitudinal swath spike teeth threshing unit installed on the longitudinal swath spokes is 0.12 m~0.15 m; the spiral feeding head is frustum cone-like, and its maximal external diameter is 0.4 m~0.6 m, and its minimal external diameter is 0.2 m~0.4 m, the height of the spiral feeding head is 0.035 m~0.045 m, the outboard height of the feeding spiral blade is flush with the outboard height of the longitudinal swath spike teeth threshing unit.

9. The cutting longitudinal swaths grain harvesting and baling combine according to claim 1, wherein the grain cleaning apparatus is located just below the cutting swath threshing and separating device and the longitudinal swath threshing and separating device, the upper vibrating screen is located above the under vibrating screen, the shuttle board is located in front of the upper vibrating screen, the sawtooth vibrating tail screen is located at the rear of the upper vibrating screen, the sieve plate is located in front of the upper vibrating screen, the upside of the sieve plate installs 3~5 pieces of scalping boards; the cleaning centrifugal fan is located just below the shuttle board, the front of the cleaning centrifugal fan is flush with the front of the shuttle board, the rear-end of the cleaning centrifugal fan is flush with the front of the upper vibrating screen, the under vibrating screen is located on the centre line of the cleaning centrifugal fan; there is a under draught distributing board and a top draught distributing board at the outlet of the cleaning centrifugal fan, an extension line of the top draught distributing board passes through the center of the upper vibrating screen, an extension line of the under draught distributing board intersects with the rear of the under vibrating screen; the grain collecting auger is installed at the downside ¼ position of the under vibrating screen, the varia collecting auger is installed at the rear downside of the under vibrating screen, the grain collecting auger is flush with the bottom of the cleaning centrifugal fan; the varia collecting auger is connected with the cleaning varia auger and the rethreshing auger, the rear-end of the rethreshing auger is located above the shuttle board and connected with the longitudinal swath threshing and separating device; the under vibrating screen uses a structure of woven screen.

10. The cutting longitudinal swaths grain harvesting and baling combine according to claim 9, wherein the length of the grain cleaning apparatus is 2.0 m~2.5 m, width is 1.2 m~1.5 m, height is 0.6 m~0.8 m; the distance between the shuttle board and the upper vibrating screen is 0.05 m~0.10 m, the rear-end of the shuttle board overlaps 0.5 m~0.8 m with the upper vibrating screen, the upper vibrating screen is located 0.10 m~0.15 m above the under vibrating screen, the external width of the upper vibrating screen and the under vibrating screen is 1.2 m~1.5 m.

11. The cutting longitudinal swaths grain harvesting and baling combine according to claim 1, wherein the straw compressing and baling apparatus is connected with the longitudinal swath threshing and separating device and is installed on the chassis platform frame; the power input mechanism transmits power to the grass feeding mechanism drive pulley, the straw knotting drive pulley and the pre press mechanism drive pulley by a single chain, the drive pulley and the baling drive tensioning wheel are installed between the power input mechanism and the pre press mechanism drive pulley; the grass feeding mechanism drive pulley is installed at the middle of the straw feeding mechanism, the straw feeding mechanism transmits straw by using a chain harrow; the pre press mechanism drive pulley transmits power to the crank pre pressing mechanism, and the crank pre pressing mechanism compresses the straw; the straw knotting drive pulley is installed at the rear-end of the straw feeding mechanism, and the straw knotting drive pulley bales and knots a compressed square straw block; the weed discharging pulley is installed at the top of the square bale discharging mechanism, then the connecting rod feeding mechanism cuts off the compressed knotted square straw bale and extracts it out of the square bale discharging mechanism.

12. The cutting longitudinal swaths grain harvesting and baling combine according to claim 11, wherein the total length of the straw compressing and baling apparatus is 2.0 m~2.5 m, and width is 0.5 m~0.7 m, and height is 0.8 m~1.2 m; an angle between the straw feeding mechanism and a main body of the straw compressing and baling apparatus is 20°~30°, and an angle between the main body of the straw compressing and baling apparatus and the horizontal is 10°~15°.

13. The cutting longitudinal swaths grain harvesting and baling combine according to claim 1, wherein the engine is located at the chassis frame member, the chassis platform frame is connected with the chassis supporting frame, and the chassis supporting frame is connected with the caterpillar band walking system; the first caterpillar band and the second caterpillar band are installed at the two sides of the chassis supporting frame, there are supporting rollers installed at the top of the first caterpillar band and the second caterpillar band, drive pulleys at the front, guide pulleys at the rear, and six thrust wheels at the middle; and the speed variator is connected with the engine and the drive pulley.

14. The cutting longitudinal swaths grain harvesting and baling combine according to claim 13, wherein the width of the chassis frame member is 2.0 m~2.5 m, and length is 2.5 m~3.5 m, and height is 0.5 m~0.6 m; the height of the first caterpillar band and second caterpillar band is 0.4 m~0.6 m, and length is 2.0 m~2.5 m, and width is 0.4 m~0.5 m.

15. The cutting longitudinal swaths grain harvesting and baling combine according to claim 1, wherein the driving system is located over the material delivery device, the rear-end of the dricab is flush with the material delivery device; the operating arm controls the working state of the material delivery device, caterpillar the band walking system, the cutting swath threshing and separating device, the longitudinal swath threshing and separating device, the straw compressing and baling apparatus, the grain cleaning apparatus, the chassis frame member and the grain storage box, the operating arm is installed in the dricab.

16. The cutting longitudinal swaths grain harvesting and baling combine according to claim 15, wherein the distance between the top of the dricab and the upside of the chassis frame member is 2.0 m~2.5 m, the longitudinal length of the dricab along the chassis frame member is 1.5 m~2.0 m, and the transverse width is 2.0 m~2.5 m.

* * * * *